US012573929B2

(12) United States Patent
Takahashi et al.

(10) Patent No.: US 12,573,929 B2
(45) Date of Patent: Mar. 10, 2026

(54) ROTARY RECIPROCATING DRIVE ACTUATOR

(71) Applicants: Yuki Takahashi, Tokyo (JP); Yasutaka Kitamura, Tokyo (JP); Masaharu Kagami, Tokyo (JP); Kai Masamoto, Tokyo (JP)

(72) Inventors: Yuki Takahashi, Tokyo (JP); Yasutaka Kitamura, Tokyo (JP); Masaharu Kagami, Tokyo (JP); Kai Masamoto, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 756 days.

(21) Appl. No.: 17/867,719

(22) Filed: Jul. 19, 2022

(65) Prior Publication Data

US 2023/0025894 A1     Jan. 26, 2023

(30) Foreign Application Priority Data

Jul. 20, 2021    (JP) ................................. 2021-119976
Jul. 20, 2021    (JP) ................................. 2021-119980

(51) Int. Cl.
    *H02K 3/16*          (2006.01)
    *H02K 33/16*        (2006.01)
    *H02K 33/18*        (2006.01)

(52) U.S. Cl.
    CPC ............. *H02K 33/16* (2013.01); *H02K 33/18* (2013.01); *H02K 2213/00* (2013.01)

(58) Field of Classification Search
    CPC .... H02K 2213/00; H02K 33/18; H02K 33/16; H02K 33/00
    See application file for complete search history.

(56) References Cited

U.S. PATENT DOCUMENTS 4,501,983 A * 2/1985 Schmider ............. H02K 11/028
                                310/154.25
5,483,113 A * 1/1996 Sakuragi ............ G11B 19/2009
                                  310/90

(Continued)

FOREIGN PATENT DOCUMENTS

DE     102010035292 A1 * 3/2012 ................. F24J 2/07
JP       07-043723       9/1995

(Continued)

OTHER PUBLICATIONS

Notice of Reasons for Refusal Dated Aug. 26, 2025 From the Japan Patent Office Re. Application No. 2021-119980 and Its Translation Into English. (6 Pages).

(Continued)

*Primary Examiner* — Terrance L Kenerly

(57) ABSTRACT

A rotary reciprocating drive actuator includes: a movable body including a shaft portion and a magnet fixed to the shaft portion; a fixing body including a core assembly, the core assembly including a core body and coils, the core body having magnetic poles, the core assembly being disposed such that the magnetic poles face an outer periphery of the magnet; and a pair of shaft supports configured to sandwich the core assembly in an extending direction of extension of the shaft portion and support the shaft portion at opposite sides of the core assembly such that the shaft portion is rotatable, in which a magnetic flux passing through the core body is generated by energization of the coils, causing reciprocating rotation of the movable body about an axis of the shaft portion by electromagnetic interaction between the magnetic flux and the magnet.

25 Claims, 20 Drawing Sheets

(56)  References Cited

U.S. PATENT DOCUMENTS

| | | | |
|---|---|---|---|
| 10,751,789 B2 * | 8/2020 | Gostylla | B23K 26/352 |
| 2003/0035188 A1 * | 2/2003 | Tominaga | G02B 26/121 |
| | | | 359/224.1 |
| 2004/0041492 A1 | 3/2004 | Ishikawa et al. | |
| 2013/0076185 A1 * | 3/2013 | Benner, Jr. | H02K 1/148 |
| | | | 310/156.01 |
| 2014/0145564 A1 | 5/2014 | Taniguchi et al. | |
| 2016/0077331 A1 | 3/2016 | Walter et al. | |
| 2022/0278600 A1 * | 9/2022 | Lee | H02K 7/08 |

FOREIGN PATENT DOCUMENTS

| | | | | |
|---|---|---|---|---|
| JP | 2004-088925 | 3/2004 | | |
| JP | 4727509 | 12/2007 | | |
| JP | 2008-301626 | 12/2008 | | |
| JP | 2014-107973 | 6/2014 | | |
| JP | 2016-524177 | 8/2016 | | |
| WO | WO-2020004514 A1 * | 1/2020 | | G02B 26/08 |

OTHER PUBLICATIONS

Decision of Refusal Dated Nov. 25, 2025 From the Japan Patent Office Re. Application No. 2021-119980 and Its Translation Into English. (6 Pages).

* cited by examiner

<u>1</u>

10

52

10

52

1A

52A

100

Laser control part — 102

Laser beam emitting part — 101

Drive signal supply part — 103

Rotaty reciprocating drive actuator

Position control signal calculation part — 104

Angle sensor part — 70

Scanning region

ROTARY RECIPROCATING DRIVE ACTUATOR

CROSS REFERENCE TO RELATED APPLICATIONS

This application is entitled and claims the benefit of priority of Japanese Patent Application No. 2021-119976, filed on Jul. 20, 2021, and Japanese Patent Application No. 2021-119980, filed on Jul. 20, 2021, the disclosure of which including the specification, drawings and abstract is incorporated herein by reference in its entirety.

TECHNICAL FIELD

The present invention relates to a rotary reciprocating drive actuator for optical scanning by driving the reciprocating rotation of a mirror.

BACKGROUND ART

Conventionally, a rotational drive actuator is used as an actuator used in a scanner (optical scanning apparatus) such as a multifunctional machine, a laser beam printer, or the like. Specifically, the rotary reciprocating drive actuator causes reciprocating rotation of the mirror of the scanner to change a reflection angle of a laser beam to achieve optical scanning of an object.

Patent literature (hereinafter, referred to as "PTL") 1 discloses a galvanometer motor as this type of rotary reciprocating drive actuator. As galvanometer motors, various types of galvanometer motors are known in addition to the type of galvanometer motor with the structure disclosed in PTL 1 and a galvanometer motor of a movable coil type in which a coil is attached to a mirror.

PTL 1 discloses a beam scanner (optical scanning apparatus) in which four permanent magnets are disposed on a rotational shaft to which the mirror is attached, such that the permanent magnets are magnetized in the radial direction of the rotational shaft, and in which cores that have magnetic poles and around which a coil is wound are disposed to sandwich the rotational shaft.

CITATION LIST

Patent Literature

PTL 1
Japanese Patent No. 4727509

SUMMARY OF INVENTION

Technical Problem

Meanwhile, in the rotary reciprocating drive actuator of the movable coil type, the heat generation of the coil during driving may adversely affect the surface state of the mirror, the bonding state of the mirror bonded to the rotational shaft, the shape of the mirror including warpage, and/or the like. Further, in the rotary reciprocating drive actuator of the movable coil type, there is a problem that it is difficult to increase an input current to the coil when considering the heat generation of the coil during energization, and it is difficult to increase the size of the mirror being a movable body and/or the amplitude. Furthermore, there is a problem that the assemblability is poor since wiring to the coil needs to be drawn out to a fixing body side with respect to the mirror being the movable body.

Further, in the apparatus of PTL 1, the rotational shaft is disposed between a pair of bearing walls disposed to be spaced from each other and to face each other. In addition, the mirror being a movable body object, and the coil and a magnet for causing a rotational reciprocating motion of the mirror are disposed between the pair of bearing walls.

Recently, miniaturization and space saving of the rotary reciprocating drive actuator used in the scanner are desired correspondingly to the size of a miniaturized scanner product.

An object of the present invention is to provide a rotary reciprocating drive actuator that can be more miniaturized and can achieve space saving more, has an impact resistance and vibration resistance characteristics, and can drive a movable object via a shaft portion in a more stable state at a high amplitude.

Solution to Problem

In order to achieve the above-mentioned purpose, the present invention includes:

a movable body including a shaft portion to which a movable object is to be connected and a magnet fixed to the shaft portion;

a fixing body including a core assembly, the core assembly including a core body and a plurality of coils, the core body having a plurality of magnetic poles, the core assembly being disposed such that the plurality of magnetic poles face an outer periphery of the magnet; and a pair of shaft supports configured to sandwich the core assembly in an extending direction of extension of the shaft portion and support the shaft portion at opposite sides of the core assembly such that the shaft portion is rotatable, in which a magnetic flux passing through the core body is generated by energization of the plurality of coils, causing reciprocating rotation of the movable body about an axis of the shaft portion by electromagnetic interaction between the magnetic flux and the magnet.

Advantageous Effects of Invention

According to the present invention, it is possible to achieve further miniaturization and space saving, provide an impact resistance and vibration resistance characteristics, drive a movable object via the shaft part in a more stable state at a high amplitude.

DESCRIPTION OF EMBODIMENTS

Embodiments of the present invention will be described below with reference to the drawings.

Figure 1:
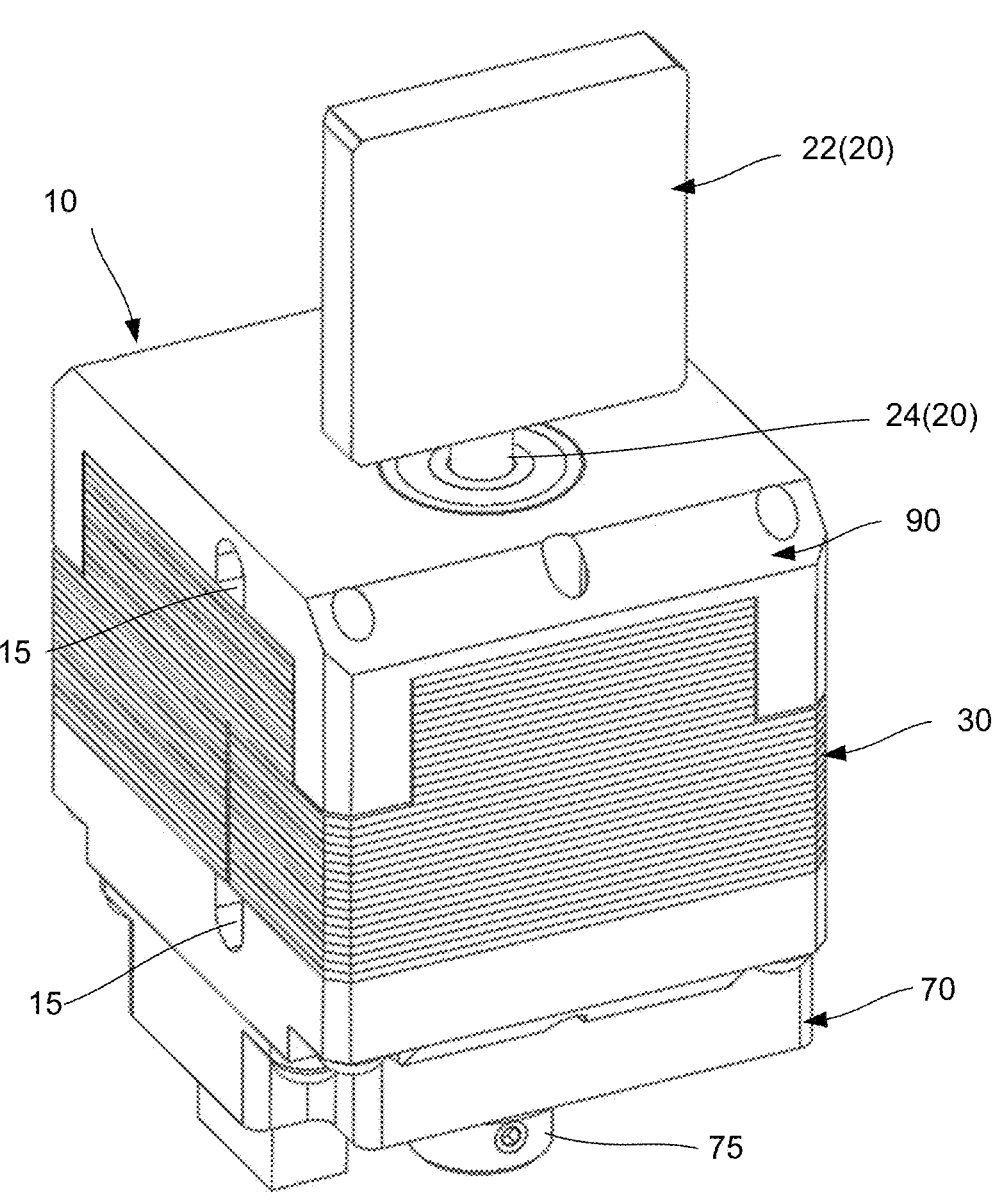
FIG. 1 is an external perspective view of a rotary reciprocating drive actuator of an embodiment.
Figure 2:
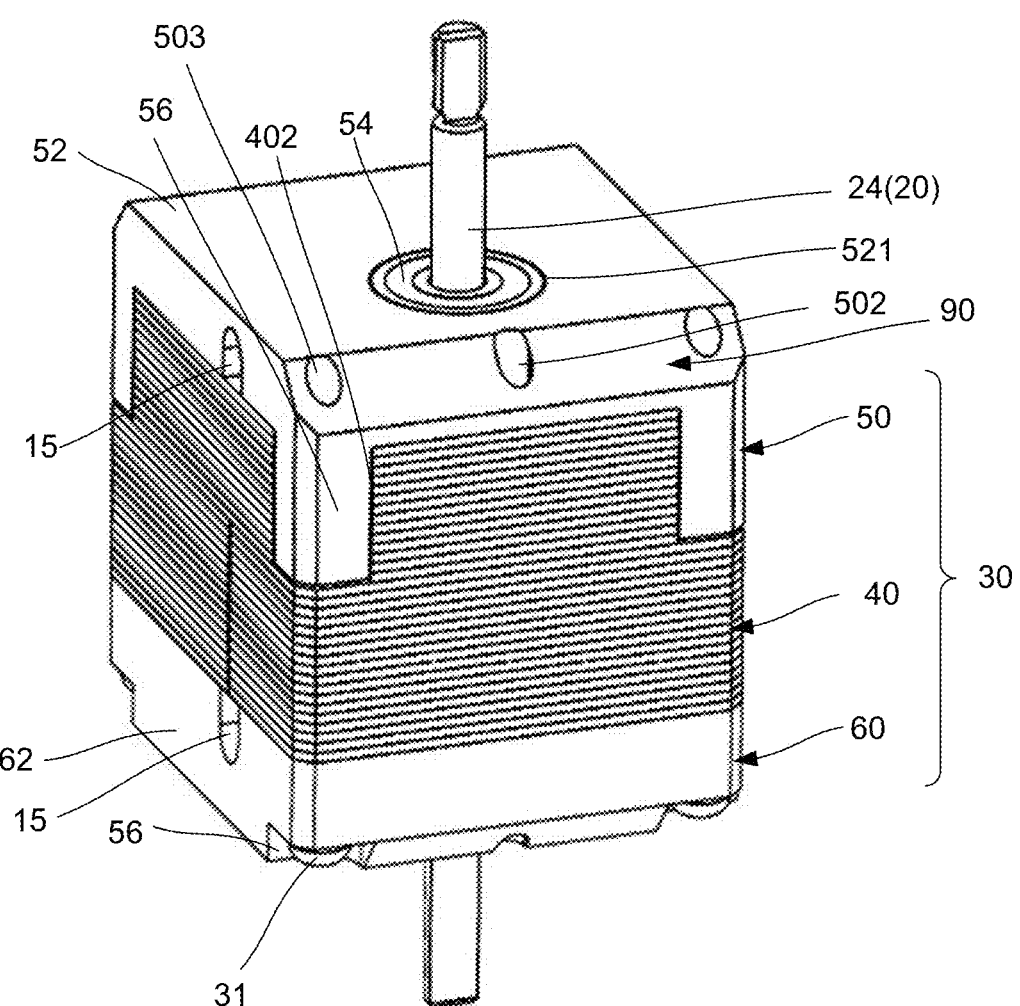
FIG. 2 is a perspective view of a driving unit of the rotary reciprocating drive actuator.
Figure 3:
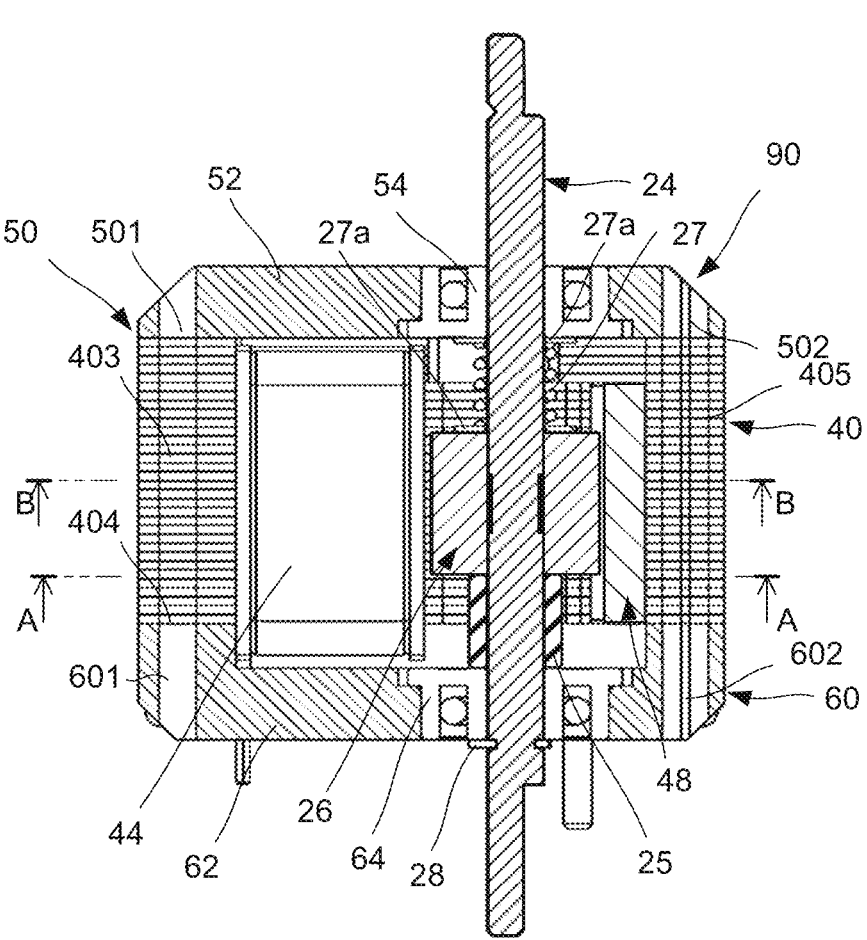
FIG. 3 is a longitudinal sectional view of the driving unit of the rotary reciprocating drive actuator.
Figure 4:
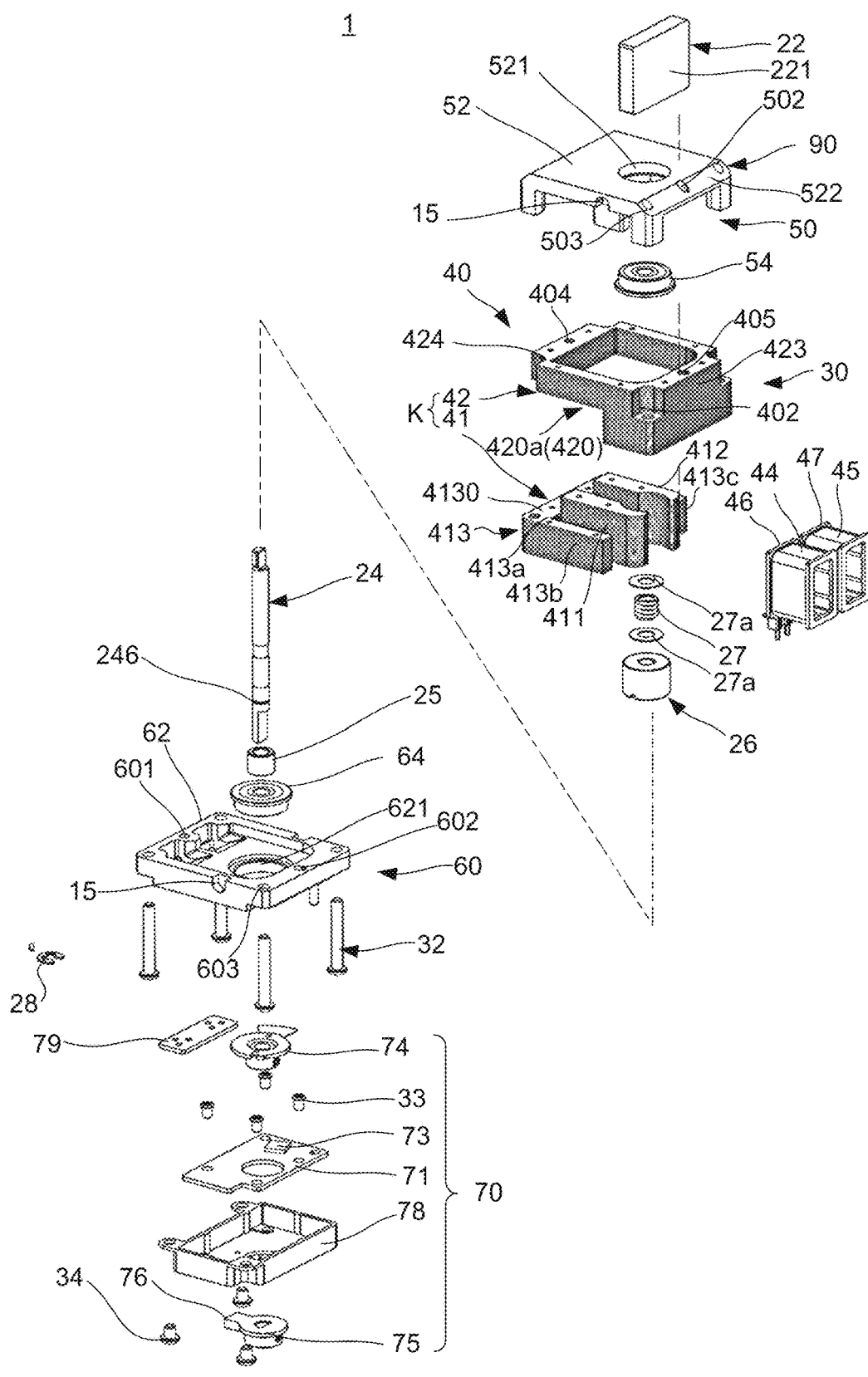
FIG. 4 is a front side exploded perspective view of the rotary reciprocating drive actuator.
Figure 5:
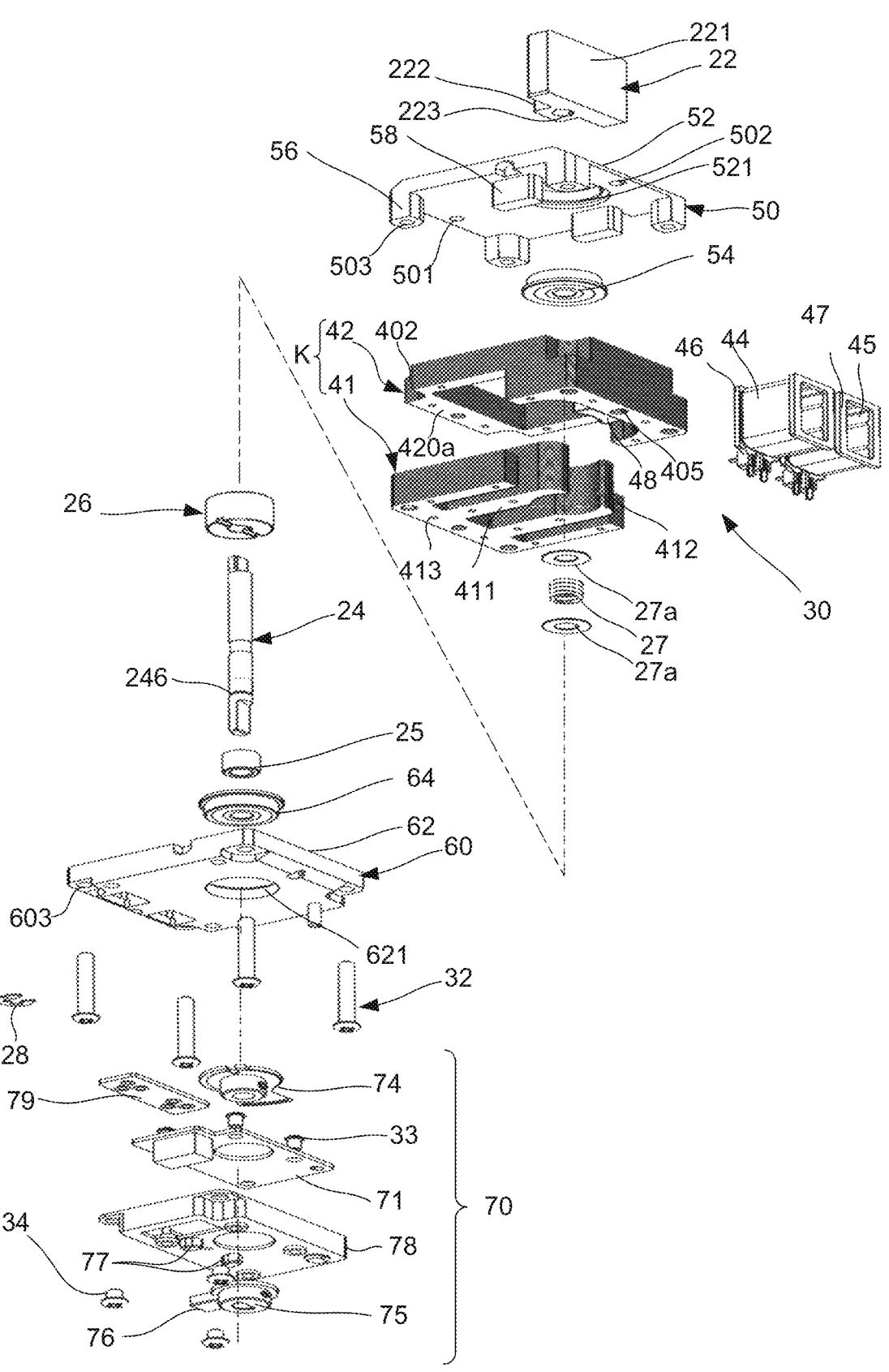
FIG. 5 is a rear side exploded perspective view of the rotary reciprocating drive actuator.

FIG. 1 is an external perspective view of a rotary reciprocating drive actuator of an embodiment. FIG. 2 is a perspective view of a driving unit of the rotary reciprocating drive actuator. FIG. 3 is a longitudinal sectional view of the driving unit. Further, FIG. 4 is a front side exploded perspective view of the rotary reciprocating drive actuator. Further, FIG. 5 is a rear side exploded perspective view of the rotary reciprocating drive actuator.

Rotary reciprocating drive actuator 1 is used, for example, in a Laser Imaging Detection and Ranging (LiDAR) apparatus. Note that, rotary reciprocating drive actuator 1 is also applicable to an optical scanning apparatus such as a multifunctional machine, a laser beam printer, or the like.

Rotary reciprocating drive actuator 1 illustrated in FIG. 1 includes: mirror part 22; driving unit 10 for supporting mirror part 22 such that mirror part 22 is rotatable and for driving reciprocating rotation of mirror part 22; and angle sensor part 70 for detecting the rotational angle position of mirror part 22.

<Mirror Part 22>

Mirror part 22 reflects incident light to emit it as scanning light. Mirror part 22 is connected to rotational shaft 24 and performs reciprocating rotation by rotation of rotational shaft 24. Mirror part 22 is a movable object in rotary reciprocating drive actuator 1. Mirror part 22 is formed by, for example, bonding mirror 221 to one surface of mirror holder 222. Rotational shaft 24 is inserted at one end portion thereof into insertion hole 223 in mirror holder 222 and is fixed thereto. Note that, movable magnet (hereinafter, simply referred to as "magnet") 26 is fixed to a portion of rotational shaft 24 disposed in unit fixing part 30 of driving unit 10. Reciprocating rotation of magnet 26 is driven using a magnetic flux generated by unit fixing part 30 to be described later. Reciprocating rotation of mirror part 22 is caused by rotation about the axis of rotational shaft 24. It is possible to orient the reflecting surface of the mirror in the radiation direction.

<Driving Unit 10>

Driving unit 10 includes unit movable part 20 including rotational shaft 24 and magnet 26, and unit fixing part 30 for driving reciprocating rotation of unit movable part 20 as illustrated in FIGS. 1 to 5. Specifically, driving unit 10 includes: unit movable part 20 that includes rotational shaft 24 protruding from a housing and to which magnet 26 is fixed; and unit fixing part 30 for driving reciprocating rotation of unit movable part 20.

Driving unit 10 supports mirror part 22 by rotational shaft 24 protruding from cube-shaped unit fixing part 30, and drives reciprocating rotation of mirror part 22 via rotational shaft 24. Unit fixing part 30 may have any shape such as a columnar shape, or may have a rectangular parallelepiped shape. Unit fixing part 30 is cube-shaped in the present embodiment. It is thus possible to reduce the placement space. Accordingly, space-saving placement such as placement in a gap in a corresponding cubic shape is possible. In driving unit 10, rotational shaft 24 is inserted through unit fixing part 30 and is supported such that reciprocating rotation is possible and in a state where opposite end portions protrude from unit fixing part 30. Note that, unit movable part 20, together with mirror part 22, forms the movable body of rotary reciprocating drive actuator 1.

<Unit Fixing Part 30>

Unit fixing part 30 is composed of parts excluding rotational shaft 24 and magnet 26 in driving unit 10 as illustrated in FIGS. 2 and 3.

Unit fixing part 30 forms a fixing body of rotary reciprocating drive actuator 1. Unit fixing part 30 includes: core assembly 40 that houses magnet 26 of unit movable part 20 therein, and from which rotational shaft 24 of unit movable part 20 protrudes; first shaft support 50; and second shaft support 60.

Unit fixing part 30 is configured such that core assembly 40 is sandwiched between first shaft support 50 and second shaft support 60 from both sides in the extending direction of rotational shaft 24, and first shaft support 50 and second shaft support 60 are fixed to core assembly 40.

In unit fixing part 30, first shaft support 50, core assembly 40, and second shaft support 60 are integrally fixed by fastening members 32. In unit fixing part 30, the end surfaces of rectangular parallelepiped core assembly 40 on opposite sides in the extending direction of rotational shaft 24 are completely covered by first shaft support 50 and second shaft support 60, respectively.

<Core Assembly 40>

Figure 6:
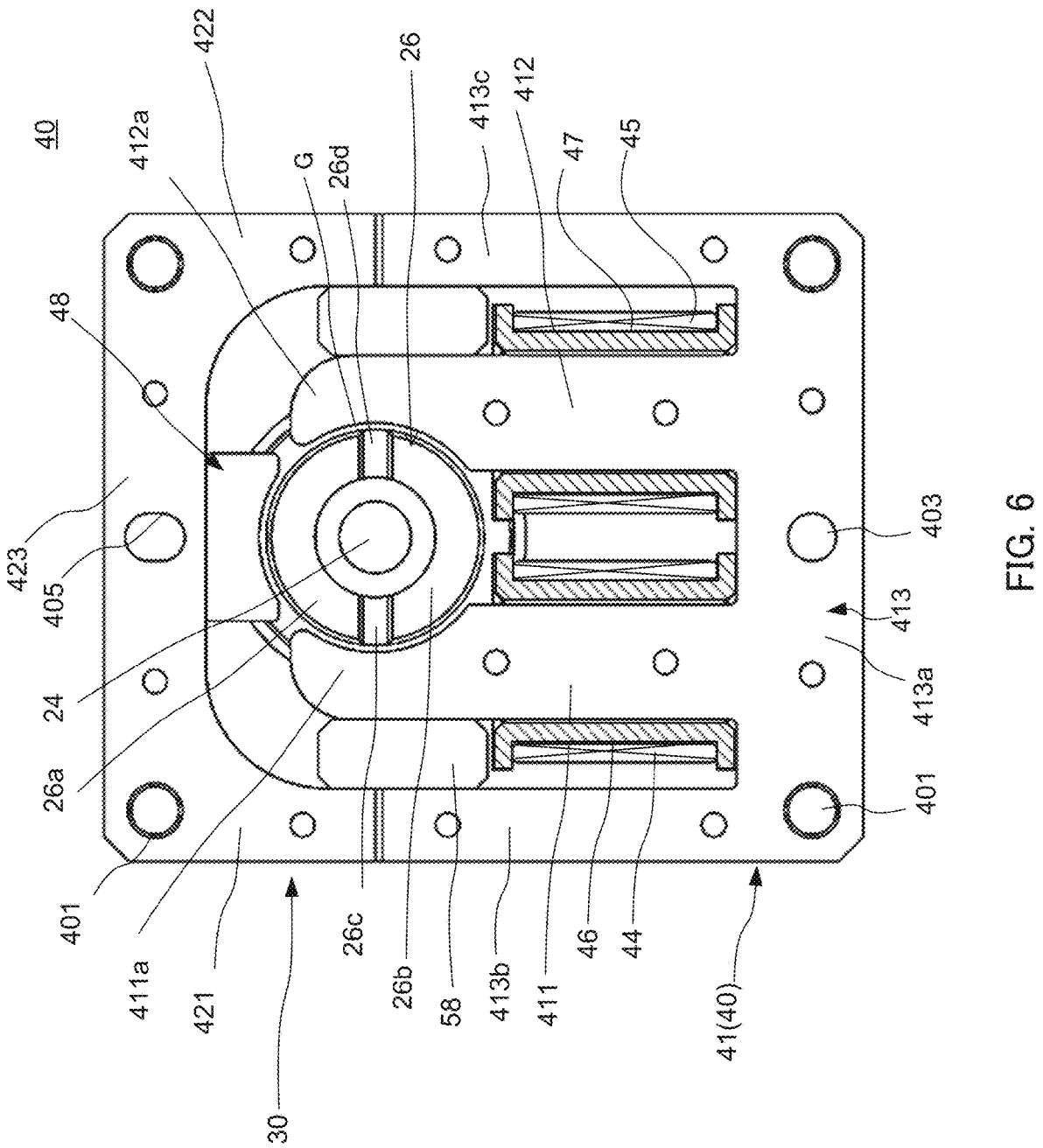
FIG. 6 is a cross-sectional view illustrating a principal part configuration of a core assembly of the rotary reciprocating drive actuator.

FIG. 6 is an explanatory view of the core assembly of the rotary reciprocating drive actuator, and is a cross-sectional view of unit fixing part 30 taken at the middle in the axial direction center and seen from the second shaft support side. Note that, FIG. 6 is a cross-sectional view illustrating a principal part configuration of the core assembly, and corresponds to the cross-sectional view taken along line A-A in FIG. 3.

Core assembly 40 includes coils 44 and 45, core body K around which coils 44 and 45 are wound, and rotational angle position holding portion 48.

In the present embodiment, core assembly 40 is formed in a rectangular shape in which magnetic poles 411a and 412a are disposed inside.

<Core Body K>

Figure 7:
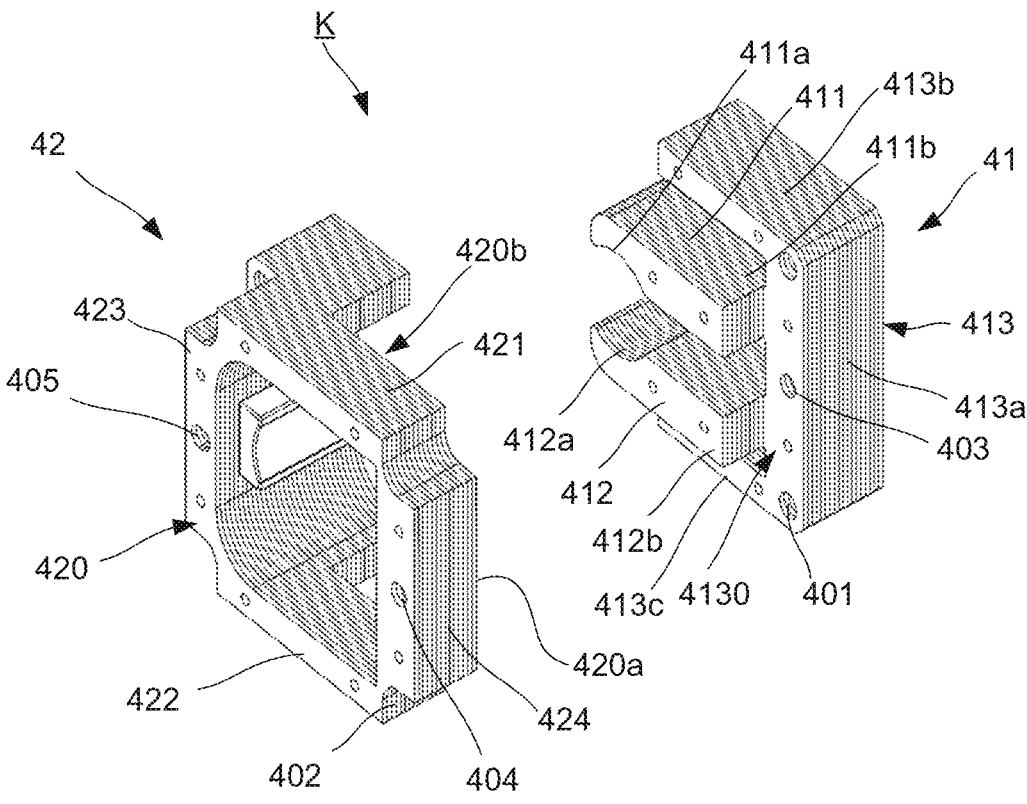
FIG. 7 is an exploded view of a core body.

FIG. 7 is an exploded view of the core body. In the present embodiment, core body K is formed by combining two divided bodies in the axial direction. Core body K includes magnetic pole core 41 having an integral structure including a plurality of magnetic poles 411a and 412a, and magnetic path core 42 magnetically coupled to and integrated with magnetic pole core 41 to form a magnetic path with magnetic pole core 41.

In the present embodiment, core body K includes rod-shaped bodies 411 and 412 having a plurality of magnetic poles 411a and 412a, and surrounding portion 420 disposed to surround rod-shaped bodies 411 and 412 from four directions and forming a magnetic path connecting magnetic poles 411a and 412a. Note that, in the present embodiment, magnetic pole core 41 and magnetic path core 42 are combined with each other. Accordingly, the length of core body K in the axial direction is longer than the width of the magnetic path. Core body K includes rod-shaped bodies 411 and 412 with a rectangular parallelepiped shape, and surrounding portion 420 formed by side portions with a rectangular parallelepiped shape into a rectangular frame shape.

Magnetic pole core 41 and magnetic path core 42 allow a magnetic flux generated during energization of coils 44 and 45 to pass through the plurality of magnetic poles 411a and 412a. Magnetic pole core 41 and magnetic path core 42 are, for example, a laminated core formed by laminating electromagnetic steel plates such as silicon steel sheets (laminated members). The laminated structure of magnetic pole core 41 and magnetic path core 42 allows formation in a complex shape at low cost.

<Magnetic Pole Core 41>

Magnetic pole core 41 includes a plurality of rod-shaped bodies 411 and 412 respectively including a plurality of magnetic poles 411a and 412a at their tip end portions, and connecting frame-shaped body 413 connecting the plurality of magnetic poles 411a and 412a, as an integral structure.

Rod-shaped bodies 411 and 412 extend in parallel to each other from base end portions 411b and 412b to the tip end portions (including magnetic poles 411a and 412a), and a plurality of coils 44 and 45 are externally fitted to the rod-shaped bodies at intermediate portions, respectively.

When magnetically excited by energization of coils 44 and 45, magnetic poles 411a and 412a at the tip end portions of rod-shaped bodies 411 and 412 assume polarities depending on the energization direction.

Rod-shaped bodies 411 and 412 have the same thickness as the thickness of core body K (the length in the extending direction of rotational shaft 24). While rod-shaped bodies 411 and 412 are flush with the surface of connecting frame-shaped body 413 on one side (the lower side in FIG. 1), their surfaces of the other side (the upper side in FIG. 1) are disposed at positions such that rod-shaped bodies 411 and 412 protrude beyond connecting frame-shaped body 413.

Thus, on the other side surface, a step portion is formed by rod-shaped bodies 411 and 412 and connecting frame-shaped body 413, and this step portion is engaged with a step portion on the magnetic path core 42 side. As a result, the surfaces of rod-shaped bodies 411 and 412 and the surrounding portion are substantially flush with each other on the opposite sides in the axial direction.

Portions of magnetic poles 411a and 412a facing magnet 26 have a shape curved along the outer peripheral surface of magnet 26. These curved shapes, for example, are disposed to face in a direction perpendicular to the extending direction of rod-shaped bodies 411 and 412.

Magnetic poles 411a and 412a have, for example, external dimensions that allow bobbins 46 and 47, around which coils 44 and 45 are wound, to be externally fitted to the magnetic poles from the tip end side. As a result, bobbins 46 and 47 can be externally fitted from the tip end side in the extending direction of rod-shaped bodies 411 and 412, that is, from the tip ends of magnetic poles 411a and 412a to the position for surrounding rod-shaped bodies 411 and 412.

Connecting frame-shaped body 413 has a U-shape, and connects rod-shaped bodies 411 and 412 to each other to integrally join a plurality of magnetic poles 411a and 412a. Note that, when magnetic pole core 41 is assembled to magnetic path core 42, connecting frame-shaped body 413 makes contact with surrounding portion 420 of magnetic path core 42 and forms a surrounded magnetic path. Connecting frame-shaped body 413 includes rectangular connecting side portion 413a, and protruding side portions 413b and 413c extending from opposite end portions of connecting side portion 413a in a direction orthogonal to connecting side portion 413a.

Connecting side portion 413a is disposed to extend in a direction orthogonal to the parallel direction of rod-shaped bodies 411 and 412, and base end portions 411b and 412b of rod-shaped bodies 411 and 412 are formed integrally with opposite end portions of the connecting side portion, respectively. In connecting side portion 413a, rod-shaped bodies 411 and 412 are joined in parallel with protruding side portions 413b and 413c between protruding side portions 413b and 413c.

Connecting side portion 413a mainly connects base end portions 411b and 412b of rod-shaped bodies 411 and 412 and base end portions 421b and 422b of lateral side portions 421 and 422 of magnetic path core 42, and forms a magnetic path disposed so as to surround coils 44 and 45. Attachment holes 401 are formed in corner portions where connecting side portion 413a and protruding side portion 413b are joined to each other and connecting side portion 413a and protruding side portion 413c are joined to each other. These corner portions are also corner portions of the four corners of core body K as seen in plan view. Fastening members 32 are inserted in attachment holes 401 for fixing first shaft support 50, magnetic path core 42, and second shaft support 60.

Protruding side portions 413b and 413c together with connecting side portion 413a include planar magnetic-pole-side contact surface 4130 which makes surface contact with magnetic-path-side contact surface 420a of magnetic path core 42.

Magnetic-pole-side contact surface 4130 is disposed entirely on a part of U-shaped connecting frame-shaped body 413 which faces magnetic path core 42. Connecting frame-shaped body 413 is brought into surface contact with and bonded to magnetic-path-side contact surface 420a of magnetic path core 42, and is thus bonded to magnetic-path-side connecting side portion 424 of magnetic path core 42 in a state in which the magnetic-pole-side contact surface 4130 is stacked on the magnetic-path-side connecting side portion over the entire surface.

In addition, connecting side portion 413a is provided with positioning hole 403 for positioning portions of magnetic path core 42, first shaft support 50, and second shaft support 60 when magnetic path core 42, first shaft support 50, and second shaft support 60 are joined together.

In magnetic pole core 41, rod-shaped bodies 411 and 412 and connecting frame-shaped body 413 are integrally formed. Thus, the positional relationship between a plurality of magnetic poles 411a and 412a does not change during assembly of rotary reciprocating drive actuator 1. That is, when unit fixing part 30 is disposed with magnetic poles 411a and 412a being disposed at positions facing magnet 26 together with magnetic path core 42 as the core body of core assembly 40, magnetic poles 411a and 412a can be positioned at accurate positions facing each other without shifting from each other.

<Magnetic Path Core 42>

Magnetic path core 42 is connected to magnetic pole core 41, and forms a magnetic path through which magnetic flux passes through magnetic poles 411a and 412a when coils 44 and 45 are energized.

Magnetic path core 42 faces connecting frame-shaped body 413 of magnetic pole core 41 in the extending direction of rotational shaft 24 while making contact with the connecting frame-shaped body, and is assembled to magnetic pole core 41, with a plurality of magnetic poles 411a and 412a being positioned around rotational shaft 24.

Magnetic path core 42 includes magnetic-path-side contact surface 420a, cutout portion 420b, engagement recesses 402, and positioning hole 404 in addition to surrounding portion 420.

Magnetic path core 42 includes surrounding portion 420 surrounding coils 44 and 45. Cutout portion 420b being a part of surrounding portion 420 is engaged with connecting frame-shaped body 413 of magnetic pole core 41. The magnetic path core is thus connected to the magnetic pole core. Surrounding portion 420 is disposed around rotational shaft 24 to surround magnetic poles 411a and 412a in addition to coils 44 and 45.

Surrounding portion 420 is formed in a rectangular frame shape, for example, and has a high strength. When connecting frame-shaped body 413 is engaged with surrounding portion 420, magnetic-path-side contact surface 420a of magnetic path core 42 comes into tight surface contact with magnetic-pole-side contact surface 4130. As a result, an integrated rectangular frame-shaped body with all four sides of the same thickness (length in the axial direction) is formed.

Surrounding portion 420 can stably position magnetic poles 411a and 412a of magnetic pole core 41. Further, surrounding portion 420 of magnetic path core 42 surrounds coils 44 and 45 from four sides. It is thus possible to prevent external contact with coils 44 and 45.

Specifically, surrounding portion 420 includes magnetic-path-side connecting side portion 424, opposite lateral side portions 421, and bridge portion 423 which are joined into a frame shape. In surrounding portion 420, cutout portion 420b is formed by cutting out portions of magnetic-path-side connecting side portion 424 and opposite lateral side portions 421 and 422 on the opposing surface side facing magnetic pole core 41.

Magnetic-path-side contact surface 420a has a U-shape corresponding to connecting frame-shaped body 413, and is disposed on a bottom surface portion of cutout portion 420b, that is, on a part of the surfaces of magnetic-path-side connecting side portion 424 and opposite lateral side portions 421 and 422 on the magnetic pole 41 side. Magnetic-path-side contact surface 420a makes contact with magnetic-pole-side contact surface 4130 of connecting frame-shaped body 413 to be overlaid with the magnetic-pole-side contact surface over the entire surface. Thus, the magnetoresistance at a bonding portion between surrounding portion 420 and connecting frame-shaped body 413 can be reduced.

Lateral side portions 421 and 422 are disposed to sandwich a pair of rod-shaped bodies 411 and 412 and extend along the parallel direction of the pair of rod-shaped bodies 411 and 412. In lateral side portions 421 and 422, the opposite end portions of magnetic-path-side connecting side portion 424 are joined to the lateral side portions at base end portions 421b and 422b, respectively, and bridge portion 423 parallel with magnetic-path-side connecting side portion 424 is disposed between the tip end portions.

When magnetic-path-side connecting side portion 424 is stacked on connecting frame-shaped body 413 to be overlaid with and make contact with the connecting frame-shaped body, the base end surfaces of the plurality of rod-shaped bodies 411 and 412 make contact with the surface of magnetic-path-side connecting side portion 424 on the magnet 26 side. Thus, the magnetic flux is easily passed.

Engagement recesses 402 are formed in the four corners of surrounding portion 420, that is, respectively in bent portions of the corner portions of the magnetic path to extend in the axial direction. Note that, attachment legs 56 of first shaft support 50 are fitted in engagement recesses 402. Thus, engagement recesses 402 restrict core assembly 40 relative to first shaft support 50 such that the core assembly moves only to be disengaged in the axial direction.

Positioning holes 404 and 405 are holes used for positioning of portions constituting unit fixing part 30 that are to be stacked in the axial direction. Positioning hole 404, positioning hole 403 in magnetic pole core 41, positioning hole 501 in first shaft support 50, and positioning hole 601 in second shaft support 60 are coaxially formed and have the same diameter, and the positioning holes form a continuous positioning through hole in the axial direction.

Positioning hole 405, positioning hole 502 in first shaft support 50, and positioning holes 602 in second shaft support 60 are coaxially formed and have the same diameter, and a continuous positioning through hole in the axial direction is formed. Positioning hole 405 in magnetic path core 42, positioning hole 502 in first shaft support 50, and positioning hole 602 in second shaft support 60 are long holes in the present embodiment.

Figure 8:
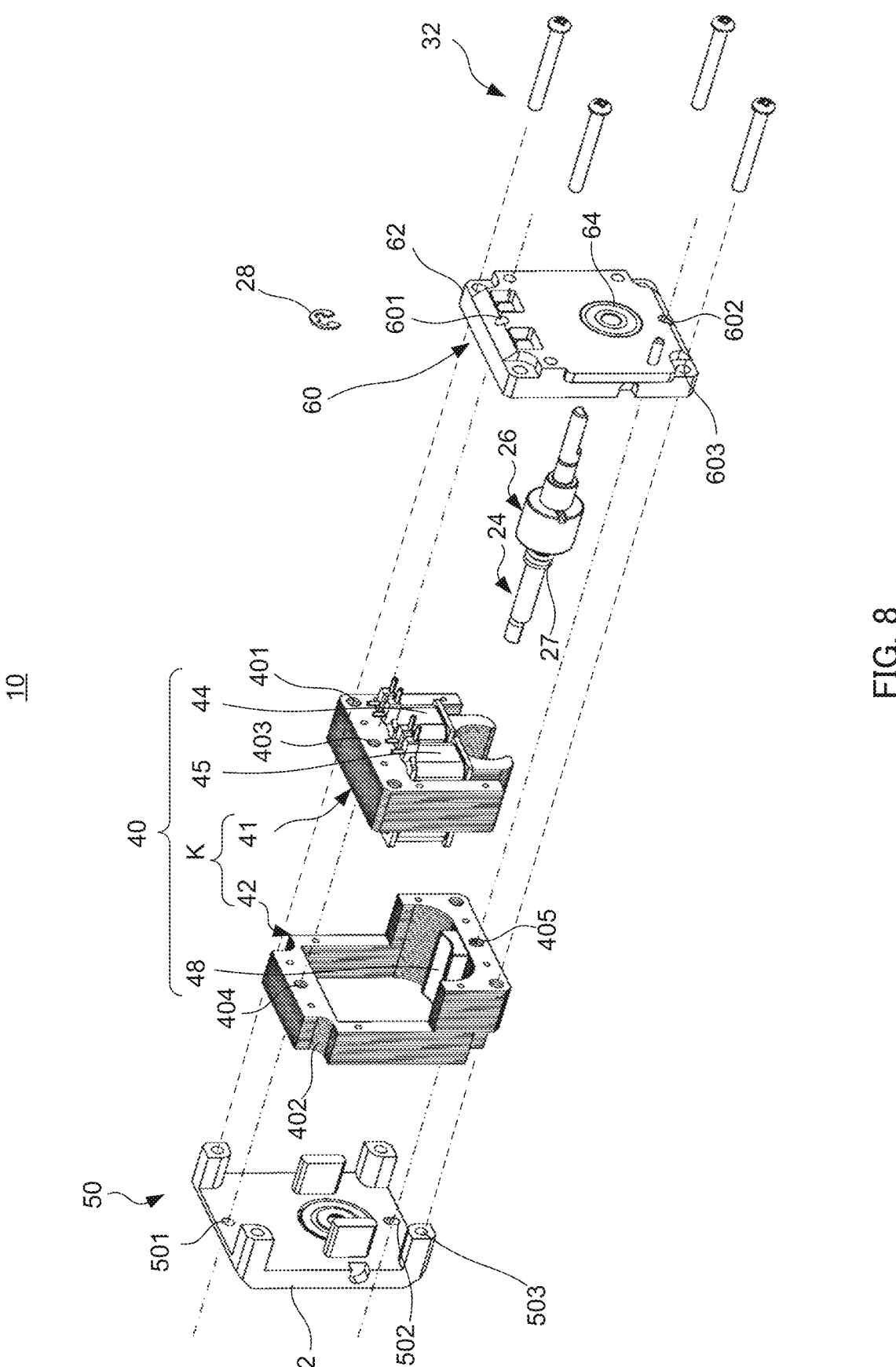
FIG. 8 is an explanatory exploded perspective view of the driving unit for explanation of assembly of the driving unit.

FIG. 8 is an explanatory exploded perspective view of a driving unit for explanation of the assembly of the driving unit. In this configuration, when joining core assembly 40, first shaft support 50 and second shaft support 60 to one another, positioning holes 403, 404, 501, and 601 are disposed to continue in the axial direction and a rod for positioning is inserted therein as illustrated in FIG. 8. In addition, positioning holes 405, 502, and 602 are disposed to continue in the axial direction and a rod for positioning is inserted therein. It is thus possible to perform positioning for joining core assembly 40, first shaft support 50, and second shaft support 60.

In this manner, core assembly 40 is sandwiched between first shaft support 50 and second shaft support 60 in a state where these are positioned. Then, fastening members 32 are inserted from the second shaft support 60 side in fastening holes 603 in second shaft support 60, attachment holes 401 in core assembly 40, and fastening holes 503 in first shaft support 50 in this order. Thus, first shaft support 50 and second shaft support 60 are fixed to core assembly 40, with core assembly 40 being sandwiched therebetween.

In this manner, positioning holes 403, 404, 501, and 601 and positioning holes 405, 502, and 602 function as common positioning holes. By inserting the rods in these common positioning through holes, it is possible to position each portion with reference to the positioning through holes. Thereafter, assembly of rotary reciprocating drive actuator 1 is performed. It is thus possible to improve the assembly accuracy, and to suppress a decrease in performance of the reciprocating rotation. It is also possible to suppress generation of variations in the reciprocating rotation output.

In the assembled state of rotary reciprocating drive actuator 1, rotational shaft 24 is inserted into a space surrounded by magnetic poles 411a and 412a. Magnet 26 attached to rotational shaft 24 is located in this space, and magnetic poles 411a and 412a face magnet 26 at accurate positions via air gap G.

Coils 44 and 45 are wound around cylindrical bobbins 46 and 47. Coil bodies composed of coils 44 and 45 and bobbins 46 and 47 are externally fitted to rod-shaped bodies 411 and 412 of magnetic pole core 41. Thus, coils 44 and 45 are disposed to be wound around rod-shaped bodies 411 and 412. Thus, coils 44 and 45 are disposed adjacently to magnetic poles 411a and 412a located at the tip end portions of rod-shaped bodies 411 and 412.

The winding directions of coils 44 and 45 are set such that a magnetic flux is appropriately generated from one of magnetic poles 411a and 412a of magnetic pole core 41 toward the other when energization is performed.

<Rotational Angle Position Holding Portion (Magnet Position Holding Portion) 48>

Rotational angle position holding portion 48 is incorporated into core assembly 40 so as to face magnet 26 via air gap G in the assembled state of rotary reciprocating drive actuator 1. Rotational angle position holding portion 48 may be fixed to unit fixing part 30, for example, to core assembly 40. Rotational angle position holding portion 48 is attached, for example, to bridge portion 423 of magnetic path core 42 (the upper portions of rod-shaped bodies 411 and 412 of magnetic pole core 41) in an attitude such that the magnetic poles face magnet 26.

Rotational angle position holding portion 48 is composed, for example, of a magnet different from magnet 26, and generates a magnetic attraction force between the magnet and magnet 26, so as to attract magnet 26. That is, rotational angle position holding portion 48, together with rod-shaped bodies 411 and 412, forms a magnetic spring between the rotational angle position holding portion and magnet 26. Because of this magnetic spring, the rotational angle position of magnet 26, i.e., the rotational angle position of rotational shaft 24 is held in a neutral position in a normal state (de-energization period) in which coils 44 and 45 are not being energized.

The neutral position is a rotation center position of the reciprocating rotation operation of magnet 26, and is a reference position that is a center position of the oscillation of magnet 26. When magnet 26 is held in the neutral position by the magnetic attraction force between the magnet and rotational angle holding portion 48, boundary portions 26c and 26d of magnet 26 face magnetic poles 411a and 412a of rod-shaped bodies 411 and 412. Further, with reference to the state in which magnet 26 is in the neutral position, the attachment attitude of mirror part 22 is adjusted. Note that, rotational angle position holding portion 48 does not have to be a magnet, and may be formed by a magnetic body that generates a magnetic attraction force between the magnetic body and magnet 26.

<First Shaft Support 50 and Second Shaft Support 60>

First shaft support 50 and second shaft support 60 illustrated in FIGS. 2 to 6 and 8 function as an electromagnetic shield, support rotational shaft 24 such that the rotational shaft is rotatable, sandwiches core assembly 40, and are fixed to core assembly 40.

First shaft support 50 and second shaft support 60 are disposed on opposite sides of core body K of core assembly 40 in the axial direction. First shaft support 50 and second shaft support 60 make it possible to suppress incidence of noise into the inside of core body K from the outside and emission of noise from core body K to the outside. Note that, positioning recesses 15 functioning for positioning during mounting rotary reciprocating drive actuator 1 itself in a product are formed in the side surfaces of first shaft support 50 and second shaft support 60, respectively. With this configuration, for example, engagement portions disposed at mounting positions of the product are engaged with positioning recesses 15. It is thus possible to perform positioning of rotary reciprocating drive actuator 1.

First shaft support 50 and second shaft support 60 include support body portions 52 and 62 in which through holes 521 and 621 are formed, and bearings 54 and 64 to be fitted into through holes 521 and 621.

Support body portions 52 and 62 are made of an electrically conductive material, and cover core assembly 40, specifically, the end faces of core body K spaced apart from each other in the axial direction, respectively. It is preferable that support body portions 52 and 62 of first shaft support 50 and second shaft support 60 be formed of, for example, an aluminum alloy. The aluminum alloy has a high degree of freedom in design, and makes it possible to easily impart desired rigidity. Therefore, the aluminum alloy is preferable when first shaft support 50 and second shaft support 60 function as bearing supports for receiving and supporting rotational shaft 24.

Figure 9:
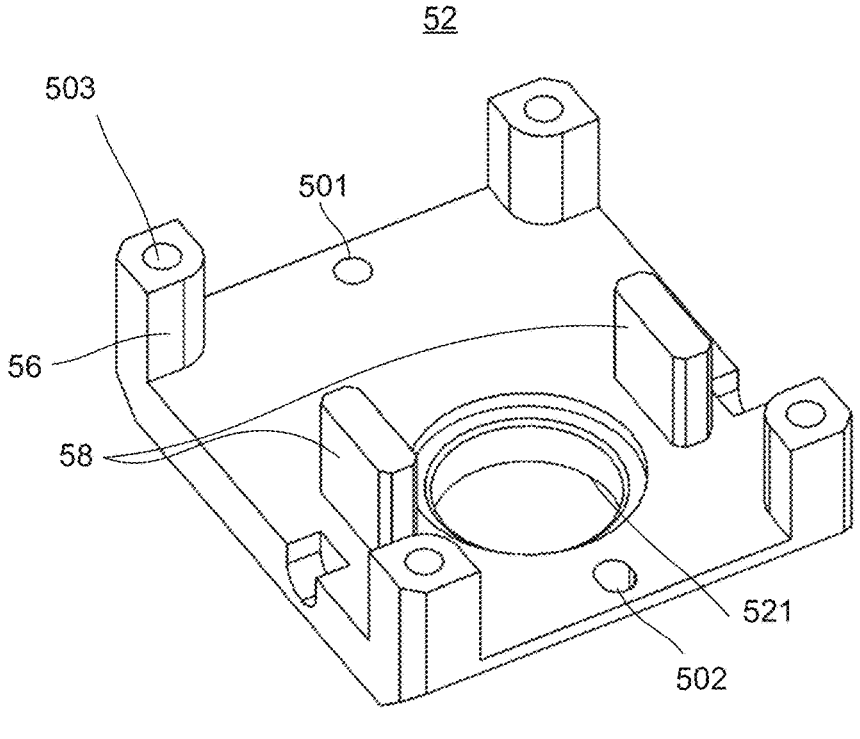
FIG. 9 is a rear perspective view of a first shaft support.

FIG. 9 is a rear perspective view of first shaft support 50. As illustrated in FIGS. 2 to 6, 8, and 9, first shaft support 50 is attached to core assembly 40 so as to cover core assembly 40 from one end side of rotational shaft 24.

First shaft support 50 includes first bearing 54 which is fitted in through hole 521 in support body portion 52. Rotational shaft 24 is rotatably inserted in first bearing 54. First support 50 supports rotational shaft 24 such that the rotational shaft is capable of reciprocating rotation via first bearing 54 disposed in support body portion 52 in a state where one end portion side of the rotational shaft protrudes. Note that a bearing attachment portion is formed on the rear surface side (core assembly 40 side) of through hole 521.

First bearing 54 is attached in a state where the movement in a fitting direction in through hole 521 is restricted. Specifically, first bearing 54 is fitted from the core assembly 40 side (rear surface side) to the bearing attachment portion in the rear surface of support body portion 52. Accordingly, a flange portion of first bearing 54 is engaged with an opening edge portion of through hole 521. Thus, the first bearing is attached to through hole 521 in a state where the movement in the fitting direction is restricted. The bearing attachment portion is formed into a recessed shape continuous to through hole 51a, for example, in the back surface of first shaft support 50, and first bearing 54 is fitted into this recessed shape. Note that, first bearing 54 is, for example, composed of a rolling bearing or a plain bearing.

Figure 10:
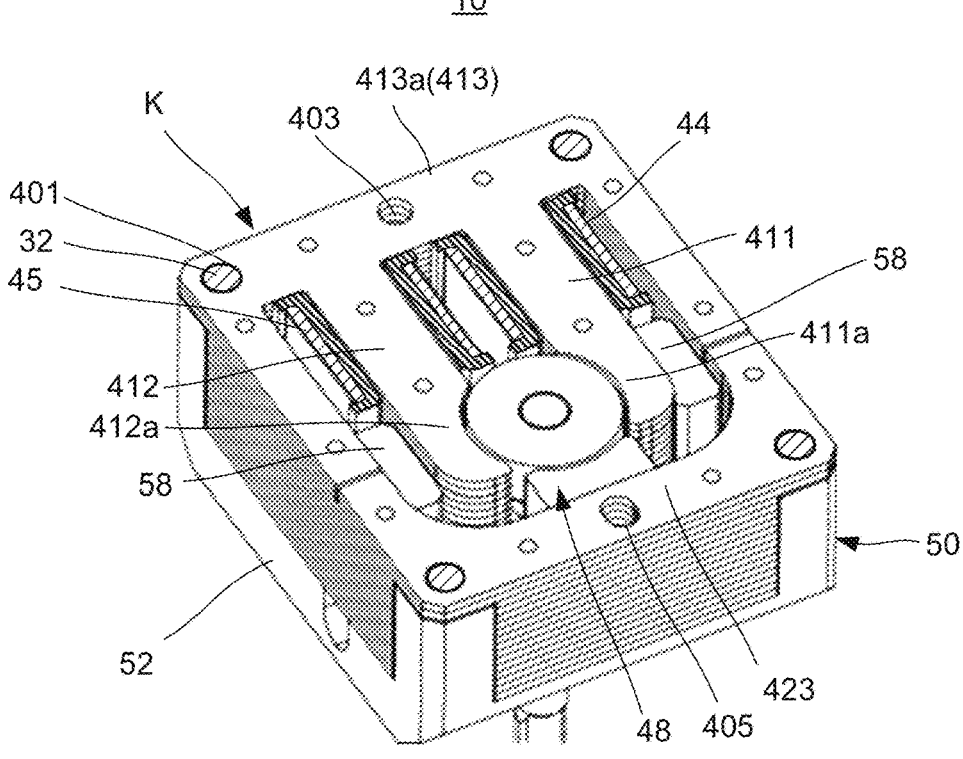
FIG. 10 is an explanatory view of a core holding portion in the core assembly.

FIG. 10 is an explanatory view of a core holding portion in core assembly 40 and is a diagram illustrating a state in which core assembly 40 is cut in a direction perpendicular to the axial direction at the tip end portion of core holding portion 58. In the present embodiment, first shaft support 50 includes core holding portions 58 disposed to protrude inward of core assembly 40 from support body portion 52.

As illustrated in FIGS. 4 to 6, core holding portions 58 are disposed to be interposed between magnetic paths in core body K of core assembly 40, to suppress the movement of the magnetic paths. Core holding portions 58 are interposed between magnetic poles 411a and 412a, lateral side portions 421 and 422, and protruding side portions 413b and 413c forming the magnetic paths. As a result, in core assembly 40, magnetic poles 411a and 412a can be prevented from moving with respect to lateral side portions 421 and 422 and protruding side portions 413b and 413c that form the magnetic paths with magnetic poles 411a and 412a, and can be held at that position.

Therefore, it is possible to suppress deformation or the like due to impact and vibration of core body K in core assembly 40. Core holding portions 58 only need to be interposed between magnetic poles 411a and 412a and each of the opposite lateral side portions of the large surrounding portion formed from lateral side portions 421 and 422 and protruding side portions 413b and 413c which are integrated with one another. As illustrated in FIG. 10, core holding portions 58 are disposed so as to protrude from the back surface of support body portion 52 of first shaft support 50 to a height up to the middle portions of magnetic poles 411a and 412a.

Support body portion 52 of first shaft support 50 is provided with positioning holes 501 and 502, attachment legs 56, and optical path avoiding portion 90. The details of optical path avoiding portion 90 will be described later.

Positioning holes 501 and 502 are formed in support body portion 52, respectively, at middle portions of the opposite side portions to extend therethrough in the axial direction.

Attachment legs 56 are disposed to protrude from the four corners of the rear surface side of support body portion 52. Attachment legs 56 are used to join first shaft support 50, second shaft support 60, and core assembly 40 together.

The shape of each of attachment legs 56, for example, corresponds to the shape of engagement recess 402 in core body K. Fastening holes 503 extending through in the axial direction are formed in attachment legs 56, respectively. Fastening members 32 are inserted into such fastening holes 503. First shaft support 50 and second shaft support 60 are fixed to core assembly 40 via fastening members 32 inserted into fastening holes 503. Fastening members 32 may fasten first shaft support 50 to second shaft support 60.

In unit fixing part 30 having a rectangular columnar shape including a cubic shape, a rectangular parallelepiped shape, or the like, for example, having a cubic shape, attachment legs 56 are disposed on the side portions at the four corners extending along the axial direction of rotational shaft 24. The attachment legs are engaged with engagement recesses 402 in core assembly 40. In this engagement state, fastening members 32 are inserted into fastening holes 503 in attachment legs 56, and are fastened to second shaft support 60 through corresponding attachment holes 401 at the four corners of core assembly 40.

As a result, first shaft support 50 restricts core body K, and thus core assembly 40, such that the core body moves only in the axial direction away from first shaft support 50. The core body is fixed also such that movement in the axial direction is restricted by fastening members 32. That is, first shaft support 50 and core assembly 40 are restricted from moving in a direction intersecting the axial direction of rotational shaft 24, and are securely integrally attached.

Second shaft support 60 is attached to core assembly 40 so as to cover core assembly 40 from the other end side of rotational shaft 24.

Second shaft support 60 includes second bearing 64 which is fitted into through hole 621 in support body portion 62. Rotational shaft 24 is rotatably inserted into second bearing 64. Second shaft support 60 supports rotational shaft 24 such that the rotational shaft is capable of reciprocating rotation via second bearing 64 disposed on support body portion 62 in a state in which the other end portion side of the rotational shaft protrudes. Note that a bearing attachment portion is formed on the rear surface side (core assembly 40 side) of through hole 621.

Second bearing 64 is put in the bearing attachment portion from the core assembly 40 side. The second bearing is attached such that the flange portion is engaged with the opening edge portion of through hole 621 and the movement in the fitting direction is restricted. The bearing attachment portion is formed, for example, in the back surface of second shaft support 60 in a recessed shape continuous to through hole 61a. Second bearing 64 is fitted into this recessed shape. Note that, second bearing 64, for example, is formed by a rolling bearing, but may also be formed by a bearing such as a plain bearing.

These first shaft support 50 and second shaft support 60 sandwich, by fastening members 32, core assembly 40 having core body K made of magnetic pole core 41 and magnetic path core 42, and are fixed to core assembly 40 to be integrated as unit fixing part 30 of driving unit 10.

Second shaft support 60 forms core assembly 40, together with first shaft support 50, via fastening members 32, and includes fastening holes 603 used as a fastening portion together with fastening members 32.

Fastening holes 603 are formed in support body portion 62 at positions corresponding to fastening holes 503 in first shaft supporting part 50 and attachment holes 401 in core assembly 40, i.e., positions facing the holes in the axial direction. Hole formation in support body portion 62 is at four corners, and is formed such that fastening members 32 are inserted, and portions (here the flange portions of head portions) of fastening members 32 are engaged with the holes. Note that, when fastening members 32 are screws or the like, recesses for screw heads (the head portions of fastening members 32) to retract therein are formed in support body portion 62. Fastening holes 603 are disposed in the recesses. Thus, in support body portion 62, even when shafts of fastening members 32 such as bolts or screws are inserted through fastening holes 603 and the head portions of fastening members 32 are engaged with peripheries of fastening holes 603, the head portions of fastening members 32 are retracted and never protrude outward.

<Unit Movable Part 20>

Magnet 26 is a ring-type magnet in which S pole 26a and N pole 26b are disposed alternately in the circumferential direction. Magnet 26 is attached to the peripheral surface of rotational shaft 24 so as to be located in a space surrounded by magnetic poles 411a and 412a of core body K after rotary reciprocating drive actuator 1 is assembled. When coils 44 and 45 are energized, rod-shaped bodies 411 and 412 and magnetic path core 42 are magnetically excited to generate polarities corresponding to the energization directions in magnetic poles 411a and 412a, and a magnetic force (attraction force and repulsion force) is generated between magnetic poles 411a and 412a and magnet 26.

In the present embodiment, magnet 26 is magnetized to different polarities changed at a plane along the axial direction of rotational shaft 24 serving as a boundary. That is, magnet 26 is a two-pole magnet magnetized so as to be equally divided into S pole 26a and N pole 26b. The number of magnetic poles of magnet 26 (two in the present embodiment) is equal to the number of magnetic poles 411a and 412a of core body K. Note that, magnet 26 may be magnetized to have two or more poles depending on the amplitude at the time of movement. In this case, magnetic pole portions of core body K are disposed correspondingly to the magnetic poles of magnet 26.

Further, as illustrated in FIGS. 3 to 5, magnet 26 is disposed between bearing 54 of first shaft support 50 and bearing 64 of second shaft support 60 and between annular spacer 25 and preload spring 27. Further, magnet 26 is fixed to rotational shaft 24. A portion of rotational shaft 24 on the other end portion side that is inserted through second bearing 64 and that protrudes outward of core assembly 40 is provided with shaft support ring 28 such that the shaft support ring protrudes in the radial direction. Specifically, shaft support ring 28 is attached by being fitted into cutout 246 formed in rotational shaft 24, and is adjacent to second bearing 64 at the other end side of rotational shaft 24.

When rotational shaft 24 is attached to unit fixing part 30, magnet 26 is disposed in unit fixing part 30 on the other end portion side of rotational shaft 24 in the axial direction, via spacer 25 interposed between the magnet and second bearing 64. In addition, at one end portion side of rotational shaft 24 between the magnet and first bearing 54, magnet 26 is disposed in a state in which preload is applied to the magnet on the spacer side via preload spring 27 sandwiched by washers 27a.

Thus, magnet 26 is disposed in a state of being positioned in unit fixing part 30. In this state, when an external force is applied to preload spring 27 in a compressive direction of preload spring 27, shaft support ring 28 restricts the movement of rotational shaft 24 and magnet 26 in a thrust direction (e.g., on the upper side in FIG. 3) with respect to unit fixing part 30. Therefore, in particular, a part (such as encoder disk 74) of angle sensor part 70 disposed on the other end portion side of rotational shaft 24 does not move with rotational shaft 24, and thus does not collide with another part, for example, with second bearing 64. Thus, the parts are not damaged.

As illustrated in FIG. 6, in magnet 26, the polarity is switched at boundary portions 26c and 26d between S pole 26a and N pole 26b (hereinafter, referred to as "magnetic pole switching portions"). Magnetic pole switching portions 26c and 26d face magnetic poles 411a and 412a, respectively, when magnet 26 is held in the neutral position.

In the neutral position, magnetic pole switching portions 26c and 26d of magnet 26 face magnetic poles 411a and 412a, and thus, unit fixing part 30 can generate the maximum torque and stably drive the movable body.

Further, by configuring magnet 26 with a two-pole magnet, a movable object is likely to be driven at a high amplitude in cooperation with core body K, and it is possible to improve the driving performance. Note that the embodiment has been described in connection with the case where magnet 26 has a pair of magnetic pole switching portions 26c and 26d, two or more pairs of magnetic pole switching portions may be included.

Figure 11:
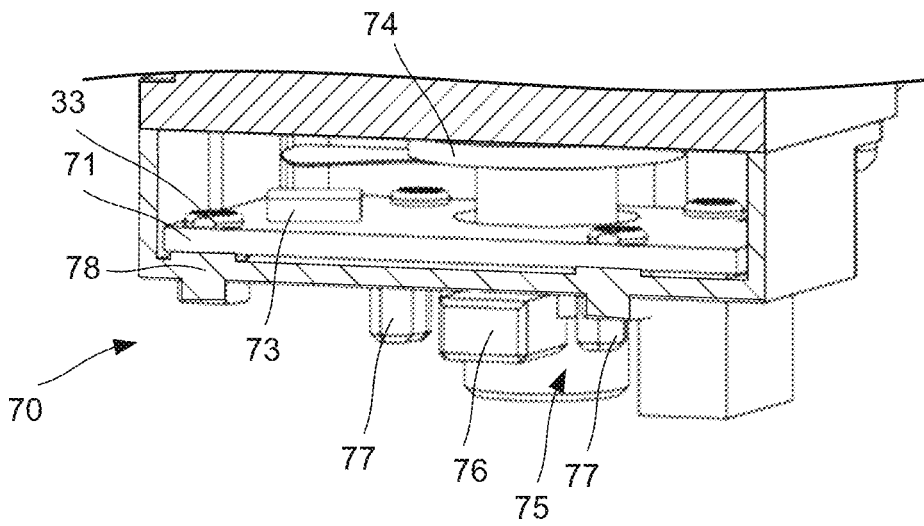
FIG. 11 is an explanatory view of an angle sensor apparatus.

FIG. 11 is an explanatory view of an angle sensor apparatus. As illustrated in FIGS. 1, 4, 5, and 11, angle sensor part 70 includes circuit board 71, optical sensor 73 mounted on circuit board 71, and encoder disk 74, and sensor attachment portion 78. Circuit board 71 is fixed to sensor attachment portion 78 by fastening members 33. Sensor attachment portion 78 also functions as a cover for covering optical sensor 73. Sensor attachment portion 78 is fixed to support body portion 62 of second shaft support 60 by fastening members 34. Sensor attachment portion 78 covers optical sensor 73. Thus, entry of impurities such as dust into optical sensor 73 can be prevented. In addition, interference by light can be prevented, and stable detection can be performed.

Encoder disk 74 has an annular shape, is fixedly attached to rotational shaft 24 via a cylindrical portion of an inner peripheral portion, and rotates integrally with magnet 26 and mirror part 22. Encoder disk 74 is disposed such that the rotation position of encoder disk 74 is the same as the rotation position of rotational shaft 24. Optical sensor 73 emits light to encoder disk 74 and detects the rotation position (angle) of encoder disk 74 based on the reflected light. Thus, it is possible to detect the rotation positions of magnet 26 and mirror part 22 by optical sensor 73.

Rotary reciprocating drive actuator 1 of the present embodiment includes driving unit 10 for driving the reciprocating rotation of mirror part 22 by rotational shaft 24. Driving unit 10 includes unit movable part 20 including rotational shaft 24 connected to magnet 26 and/or mirror part 22, and unit fixing part 30 including first shaft support 50, core assembly 40, and second shaft support 60.

Unit fixing part 30 supports mirror part 22 by rotational shaft 24 protruding from the first shaft support 50 side. Angle sensor part 70 for detecting the rotational angle of rotational shaft 24 protruding from the second shaft support 60 side is disposed on second shaft support 60. Angle sensor part 70 is attached to the outer surface side of second shaft support 60 between second shaft support 60 and rotational shaft 24.

Angle sensor part 70 is capable of detecting the rotational angle of the movable body including magnet 26 and rotational shaft 24, and controls the rotational angle position and the rotation speed of a movable object during driving, specifically, mirror part 22 being an object to be moved.

Optical sensor 73 of angle sensor part 70 is attached to sensor attachment portion 78 attached to second shaft support 60. Only by removal of sensor attachment portion 78 from second shaft support 60, optical sensor 73 can be easily removed. Note that, board 79 for a driving power supply of vibration actuator 1 is attached to sensor attachment portion 78. Coils 44 and 45 are connected to board 79 to supply power to coils 44 and 45.

Thus, it becomes easy to replace angle sensor part 70 when any failure is caused in angle sensor part 70. Further, attachment of angle sensor part 70 at the final stage of assembly becomes possible. As a result, it is possible to attach expensive angle sensor part 70 after confirming that the assembly of the other parts is successful. It is thus possible to reduce the risk such as wasting expensive angle sensor part 70, in particular, optical sensor 73 because of assembly failure of other components. Further, even when the actuator has a failure after attachment, it is possible to immediately remove optical sensor 73 by removing sensor attachment portion 78.

Figure 12:
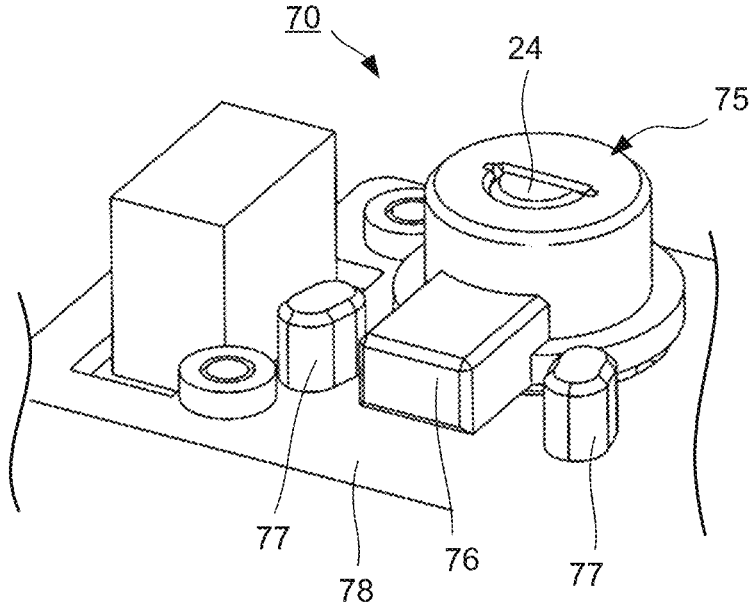
FIG. 12 is a perspective view of a stopper.

FIG. 12 is a perspective view illustrating a stopper. An end portion of rotational shaft 24 opposite to the one end portion to which mirror part 22 is connected is disposed to protrude from sensor attachment portion 78. Stopper portion 75 for restricting the rotation of rotational shaft 24 is disposed on the end portion. Stopper portion 75 is provided with protruding portion 76 protruding in the radial direction. Restricting portions 77 are disposed on the outer surface of sensor attachment portion 78 within the rotation range of protruding portion 76. When stopper portion 75 is rotated, protruding portion 76 makes contact with restricting portions 77. Thus, the rotation range is restricted. It is thus possible to limit the maximum rotational angle of rotational shaft 24, to prevent interference with other components, and to prevent deformation and damage due to the interference.

Figure 13:
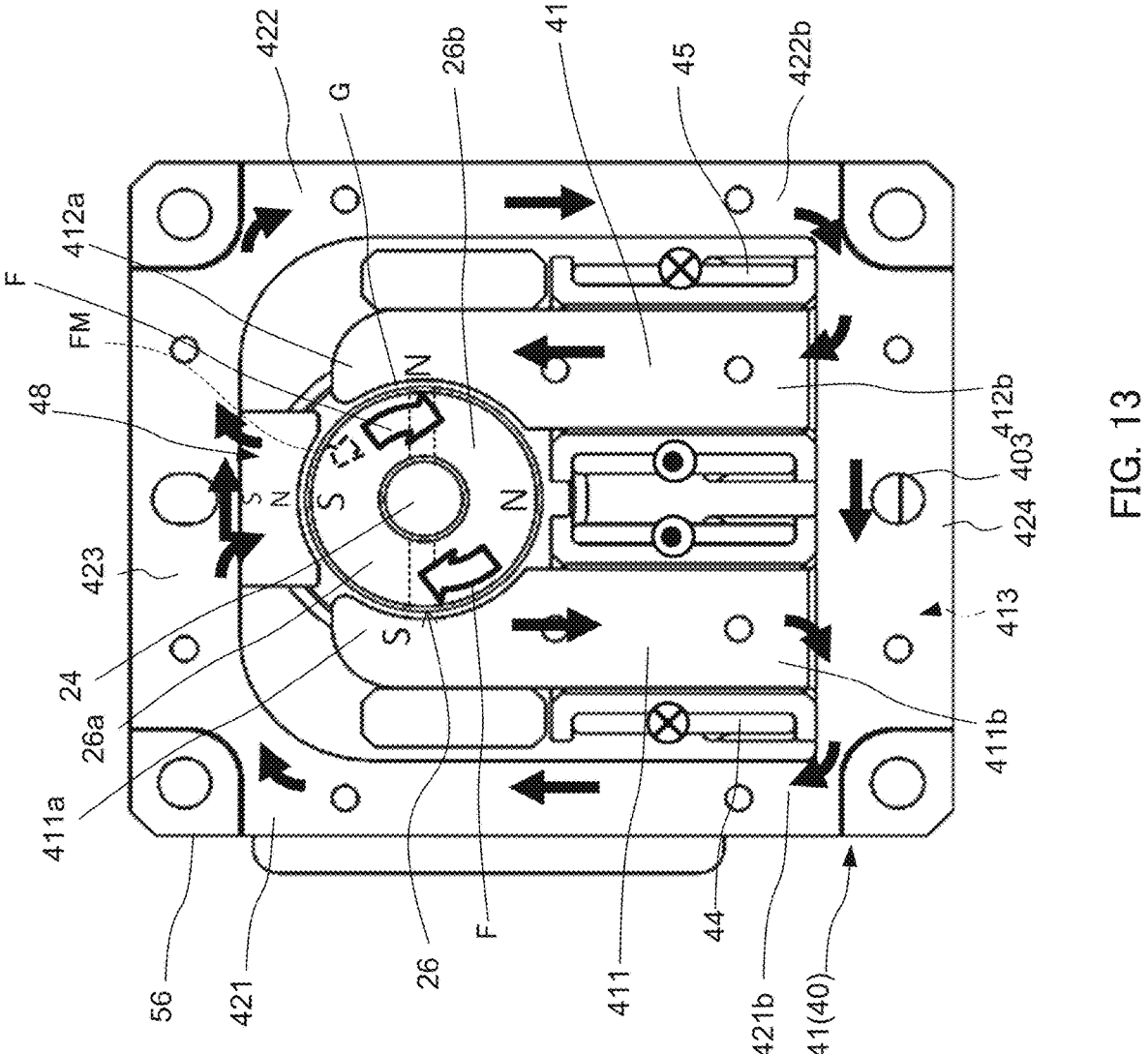
FIG. 13 is an explanatory view of an operation of a magnetic circuit of the rotary reciprocating drive actuator.
Figure 14:
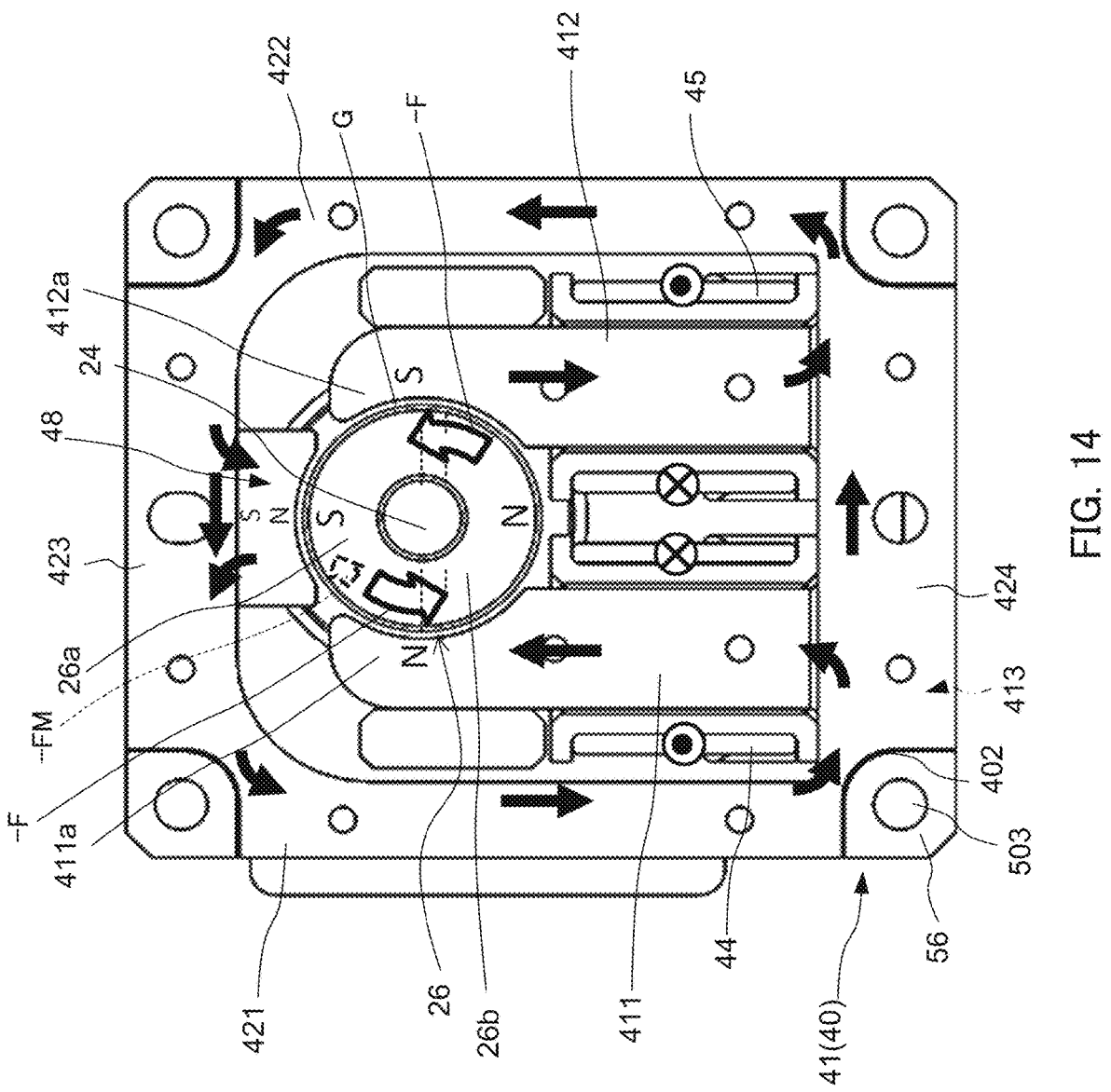
FIG. 14 is an explanatory view of the operation of the magnetic circuit of the rotary reciprocating drive actuator.

Next, the operation of rotary reciprocating drive actuator 1 will be described with reference to FIGS. 6, 13, and 14. FIGS. 13 and 14 are diagrams for explaining the operation of the magnetic circuit of rotary reciprocating drive actuator 1, and are diagrams illustrating the magnetic circuit configuration based on the cross-sectional view taken along line B-B of FIG. 3.

Two magnetic poles 411a and 412a of core body K of core assembly 40 are disposed so as to sandwich magnet 26 with air gap G therebetween. During de-energization of coils 44 and 45, magnet 26 is held in the neutral position by the magnetic attraction force between the magnet and rotational angle position holding portion 48 as illustrated in FIG. 3.

In this neutral position, one of S pole 26a and N pole 26b of magnet 26 (S pole 26a in FIG. 13) is attracted to rotational angle position holding portion 48 (see magnetic spring torque FM in FIG. 13, and magnetic spring torque −FM in FIG. 14). At this time, magnetic pole switching portions 26c and 26d face the center positions of magnetic poles 411a and 412a of core body K.

When coils 44 and 45 are energized, core body K is magnetically excited, and magnetic poles 411a and 412a have polarities corresponding to the energization directions. As illustrated in FIG. 13, when coils 44 and 45 are energized, a magnetic flux is generated inside core body K, and magnetic pole 411a becomes the S pole and magnetic pole 412a becomes the N pole. Thus, magnetic pole 411a magnetized to the S pole attracts N pole 26b of magnet 26, and magnetic pole 412a magnetized to the N pole attracts S pole 26a of magnet 26. Then, torque in the F direction is generated in magnet 26 around the axis of rotational shaft 24, and magnet 26 rotates in the F direction. Along with this, rotational shaft 24 also rotates in the F direction, and mirror part 22 fixed to rotational shaft 24 also rotates in the F direction.

Next, as illustrated in FIG. 14, when coils 44 and 45 are energized in the opposite direction, the flow of the magnetic flux generated inside core body K is generated in the opposite direction. Then, magnetic pole 411a becomes the N pole and magnetic pole 412a becomes the S pole. Magnetic pole 411a magnetized to the N pole attracts S pole 26a of magnet 26, and magnetic pole 412a magnetized to the S pole attracts N pole 26b of magnet 26. Then, torque −F in the direction opposite to the F direction is generated in magnet 26 around the axis of rotational shaft 24, magnet 26 rotates in the −F direction. Along with this, rotational shaft 24 also rotates, and mirror part 22 fixed to rotational shaft 24 also rotates. By repeating the above operation, rotary reciprocating drive actuator 1 drives reciprocating rotation of mirror part 22.

Practically, rotary reciprocating drive actuator 1 is driven by an AC wave input from a power supply part (e.g., corresponding to drive signal supply part 103 in FIG. 25) to coils 44 and 45. That is, the energization direction of coils 44 and 45 is switched periodically. When switching the energization direction, the magnetic attraction force between rotational angle position holding portion 48 and magnet 26, that is, the restoring force of the magnetic spring (magnetic spring torque FM or −FM illustrated in FIGS. 13 and 14) biases magnet 26 such that the magnet returns to the neutral position. Thus, the torque in the F direction around the axis and the torque in the direction opposite to the F direction (−F direction) act alternately on the movable body. Thus, reciprocating rotation of the movable body is driven.

The driving principle of rotary reciprocating drive actuator 1 will be briefly described below. In rotary reciprocating drive actuator 1 of the present embodiment, letting the inertial moment of the movable body (unit movable part 20) be J [kg·m$^2$], and the spring constants in the torsional directions of the magnetic springs (magnetic poles 411a and 412a, rotational angle position holding portion 48, and magnet 26) be K$_{sp}$, the movable body vibrates (performs reciprocating rotation) with respect to the fixing body (unit fixing part 30) at resonant frequency F$_r$ [Hz] calculated as given by Equation 1.

[1]

$$Fr = \frac{1}{2\pi}\sqrt{\frac{K_{sp}}{J}} \qquad \text{(Equation 1)}$$

Fr: Resonant frequency [Hz]
J: Inertial moment [kg/m$^2$]
K$_{sp}$: Spring constant [N·m/rad]

Since the movable body is a mass in a vibration model of a spring-mass system, the movable body is brought into a resonance state when the AC wave of a frequency equal to resonant frequency F$_r$ of the movable body is input to coils 44 and 45. That is, the movable body can be efficiently vibrated by inputting the AC wave of a frequency being substantially equal to resonant frequency F$_r$ of the movable body to coils 44 and 45 from the power supply part.

The equation of motion and the circuit equation representing the driving principle of rotary reciprocating drive actuator 1 are shown below. Rotary reciprocating drive actuator 1 is driven based on the equation of motion represented by Equation 2 and the circuit equation represented by Equation 3.

[2]

$$J\frac{d^2\theta(t)}{dt^2} = K_t i(t) - K_{sp}\theta(t) - D\frac{d\theta(t)}{dt} - T_{Loss} \qquad \text{(Equation 2)}$$

J: Inertial moment [kg/m$^2$]
θ(t): Angle [rad]
K$_t$: Torque constant [N·m/A]
i(t): Current [A]
K$_{sp}$: Spring constant [N·m/rad]
D: Damping coefficient [N·m/(rad/s)]
T$_{Loss}$: Loading torque [N·m]

[3]

$$e(t) = Ri(t) + L\frac{di(t)}{dt} + K_e\frac{d\theta(t)}{dt} \qquad \text{(Equation 3)}$$

e(t): Voltage [V]
R: Resistance [Ω]
L: Inductance [H]
K$_e$: Counter electromotive force constant [V/(rad/s)]

That is, inertial moment J [kg·m$^2$], rotational angle θ(t) [rad], torque constant K$_t$ [N·m/A], current i(t) [A], spring constant K$_{sp}$ [N·m/rad], damping coefficient D [N·m/ (rad/s)], loading torque T$_{Loss}$ [N·m], and the like of the movable body in rotary reciprocating drive actuator 1 may be changed appropriately as long as Equation 2 is satisfied. In addition, voltage e(t) [V], resistance R [Ω], inductance L [H], and reverse electromotive force constant $K_e$ [V/(rad/s)] may be changed appropriately as long as Equation 3 is satisfied.

As is understood, rotary reciprocating drive actuator 1 can efficiently obtain large vibrational outputs when the coils are energized by an AC wave corresponding to resonant frequency $F_r$ determined by inertial moment J of the movable body and spring constant $K_{sp}$ of the magnetic spring.

<Summary>

As described above, rotary reciprocating drive actuator 1 according to the present embodiment includes rotational shaft (shaft portion) 24 to which the mirror part (movable object) is connected, and movable part 20 including magnet 26 fixed to rotational shaft 24. Note that, magnet 26 is a ring-type magnet in which S pole 26a and N pole 26b are alternately disposed on the outer peripheral surface in the circumferential direction.

In addition, rotary reciprocating drive actuator 1 includes unit fixing part 30. Unit fixing part 30 includes core assembly 40 including core body K including a plurality of magnetic poles 411a and 412a and a plurality of coils 44 and 45 for generating magnetic flux in core body K during energization. In unit fixing part 30, core assembly 40 is disposed such that the plurality of magnetic poles 411a and 412a face the outer periphery of magnet 26 and the plurality of coils 44 and 45 are parallel to each other.

First shaft support 50 and second shaft support 60 that are a pair of shaft supports for supporting rotational shaft 24 such that the rotational shaft is rotatable are disposed respectively on opposite sides of rotational shaft 24 of core assembly 40 in the extending direction. Such a pair of shaft supports 50 and 60 are fixed while sandwiching core assembly 40, and allow reciprocating rotation of movable part 20 about the axis of rotational shaft 24 by electromagnetic interaction between the magnetic flux and magnet 26.

As is understood, mirror part 22 being a movable object is rotatably supported by the pair of shaft supporting parts 50 and 60 fixed to sandwich core assembly 40, and is supported to be capable of reciprocating rotation via rotational shaft 24 protruding from unit fixing part 30 on one side. Thus, in rotary reciprocating drive actuator 1, it is possible to reliably stably movably support mirror part 22 via rotational shaft 24 even when the rotational shaft is a cantilever.

That is, a portion of unit fixing part 30 where magnet 26 of rotational shaft 24 is disposed is supported at two points such that core assembly 40 is sandwiched between first shaft support 50 and second shaft support 60. Thus, even when the magnetic attraction force between magnet 26 and rotational angle position holding portion 48 is increased, it is possible to ensure the linearity of rotational shaft 24. That is, when the portion of rotational shaft 24 on which magnet 26 is disposed is supported only by second shaft support 60 and is thus cantilevered, and when the magnetic attraction force between magnet 26 and rotational angle position holding portion 48 is increased, rotational shaft 24 might be bent toward the rotational angle position holding portion 48 side, and a decrease in linearity might thus be caused. However, such a problem does not occur.

As is understood, according to rotary reciprocating drive actuator 1, it is possible to further reduce the size and space. The rotary reciprocating drive actuator has an impact resistance and vibration resistance characteristics, and can drive the movable object via the shaft portion more stably at a high amplitude.

Meanwhile, as described in PTL 1, in an actuator used in a common optical scanning apparatus causes light to be incident on a rotary mirror, and performs optical scanning by adjusting the angle of light incident.

Depending on the rotational angle of the mirror, it may happen that an external corner portion including a corner portion of the actuator becomes an obstacle to an optical path and blocks the optical path to the mirror, and light does not reach the mirror. In this case, it is necessary to dispose the mirror at a position farther in the axial direction to ensure the optical path to the mirror at any rotational angle of the mirror when scanning with light while rotating the mirror.

However, in this configuration, there is a problem that the shaft for supporting the mirror such that the mirror is rotatable is lengthened, and correspondingly, the product size in which the actuator is to be mounted is enlarged. Further, the optical scanning apparatus generally occupies a large percentage of the entire space in the product. Thus, when the optical scanning apparatus can be miniaturized, the entire product can also be miniaturized. Therefore, it is required to reduce the size of the optical scanning apparatus. Therefore, as the rotary reciprocating drive actuator, such a rotary reciprocating drive actuator as that enabling miniaturization to reduce the dimensions occupying the product in which the rotary reciprocating drive actuator is to be mounted, and such as that capable of suitably scanning are also demanded. To achieve this object, in rotary reciprocating drive actuator 1 of the present embodiment, driving unit 10 is provided with optical path avoiding portion 90 forming an optical path allowing incidence on mirror part 22 from the driving unit 10 side.

Figure 15:
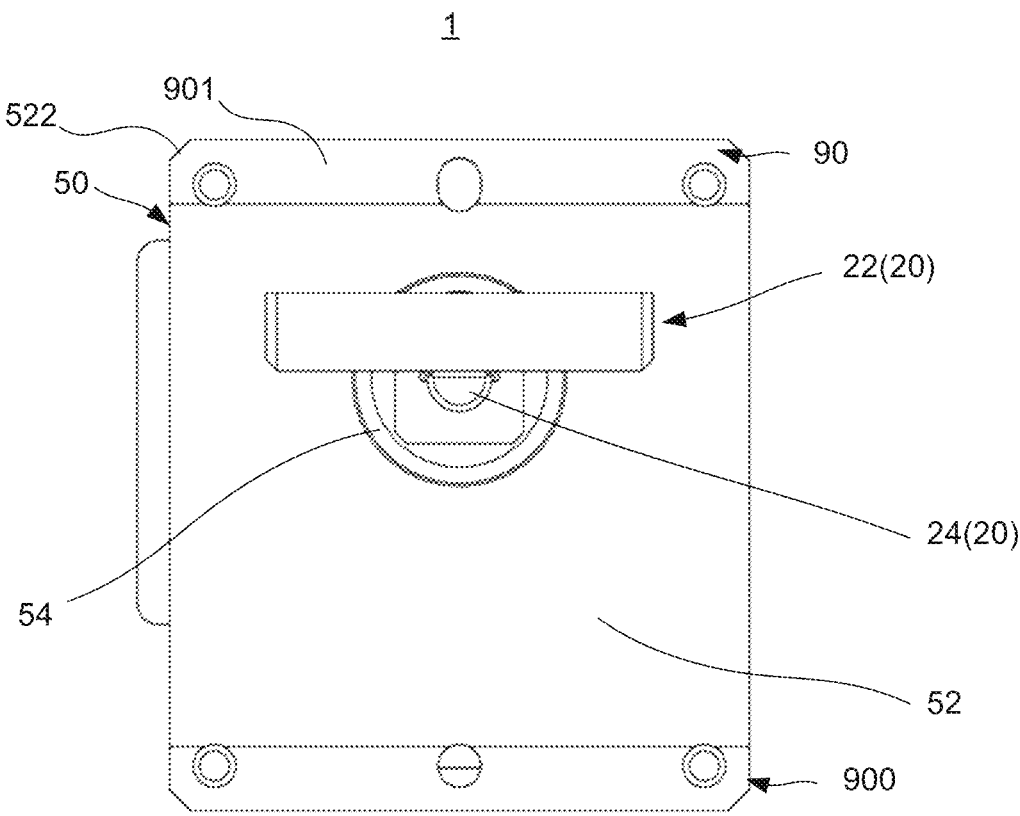
FIG. 15 is a plan view of the rotary reciprocating drive actuator.
Figure 16:
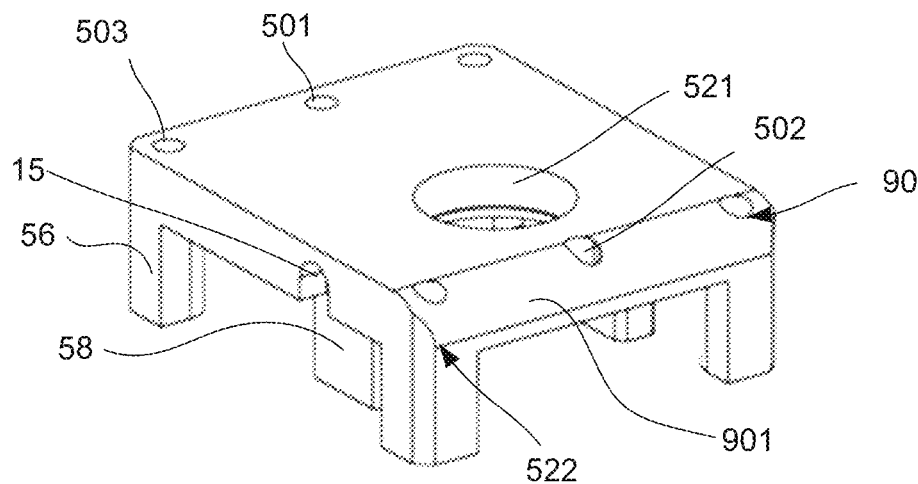
FIG. 16 is a front perspective view illustrating the first shaft support having an optical path avoiding portion.

Optical path avoiding portion 90 guides the optical path by avoiding the optical path to allow light to be stably incident on mirror part 22 and not to let a part of driving unit 10 be an obstacle. FIG. 15 is a plan view of a rotary reciprocating drive actuator, and FIG. 16 is a diagram illustrating first shaft support 50 including optical path avoiding portion 90.

Optical path avoiding portion 90 is disposed on an external corner portion at an edge portion of first shaft support 50 that is a surface where rotational shaft 24 is disposed to protrude.

Optical path avoiding portion 90 is for ensuring an optical path of light incident on mirror part 22 and is disposed on the external corner portion of driving unit 10. Optical path avoiding portion 90, for example, has a shape resulting from cutting out the external corner portion, and is disposed such that an end portion of an effective reflection region of mirror part 22 on the base end side does not overlap with an imaginary surface being an extension of the bottom surface of the optical path avoiding portion, i.e., such that the end portion of the effective reflection region of mirror part on the base end side is positioned on the shaft tip end side of the imaginary surface being the extension of the bottom surface. Here, the effective reflection region is a range of incident light where the incident light can be reflected and emitted as scanning light by the mirror rotated when the light is incident on mirror 22. When light is incident within this range, it is possible to perform suitable optical scanning regardless of the rotational angle of mirror part 22.

That is, optical path avoiding portion 90 is formed such that the imaginary surface being an extension of light guiding surface 901 (see C1 in FIG. 17) intersects the mirror or rotational shaft 24 at a position closer to unit fixing part 30 than the end portion of the effective reflection region of the mirror on the unit fixing part 30 side is to the unit fixing part. Optical path avoiding portion 900 may be disposed separately from optical path avoiding portion 90.

Thus, mirror part 22 can reflect incident light and emit the light as scanning light, regardless of the rotational angle of the mirror part. It is preferable that the angle formed between the imaginary plane (C1) and rotational shaft 24 be 45°. In the case of 45°, it is easy to appropriately adjust placement of a light source and the reflection angle of light reflected by mirror part 22. Thus, such an angle facilitates placement. Further, a reflection angle of 90° is achieved. Thus, also the optical path design becomes easier. Note that, it is preferable that an angle of 45° (which is approximately 45°, and includes a value in the vicinity of 45°) formed between the imaginary plane (C1) and rotational shaft 24 be similarly applied to modifications described later.

In vibration actuator 1, as illustrated in FIG. 15, rotational shaft 24 is disposed to protrude from an end face of vibration actuator 1 at a position shifted from the central portion of support main body 52 of first shaft support 50 as seen in plan view to the light incidence side at which light is incident. The placement position of rotational shaft 24 is located at an edge portion of supporting part main body 52 on the optical path avoiding portion 90 side with respect to the central portion of support main body 52. Thus, it is possible to dispose mirror part 22 at the position deviated from the imaginary surface being an extension of guiding surface 901 of optical path avoiding portion 90, without increasing the length of rotational shaft 24. It is thus possible to shorten the shaft dimensions of rotational shaft 24 for supporting mirror part 22. Accordingly, the dimensions occupying the product in which the rotary reciprocating drive actuator is to be mounted is suppressed, and it is possible to contribute to miniaturization.

Figure 17:
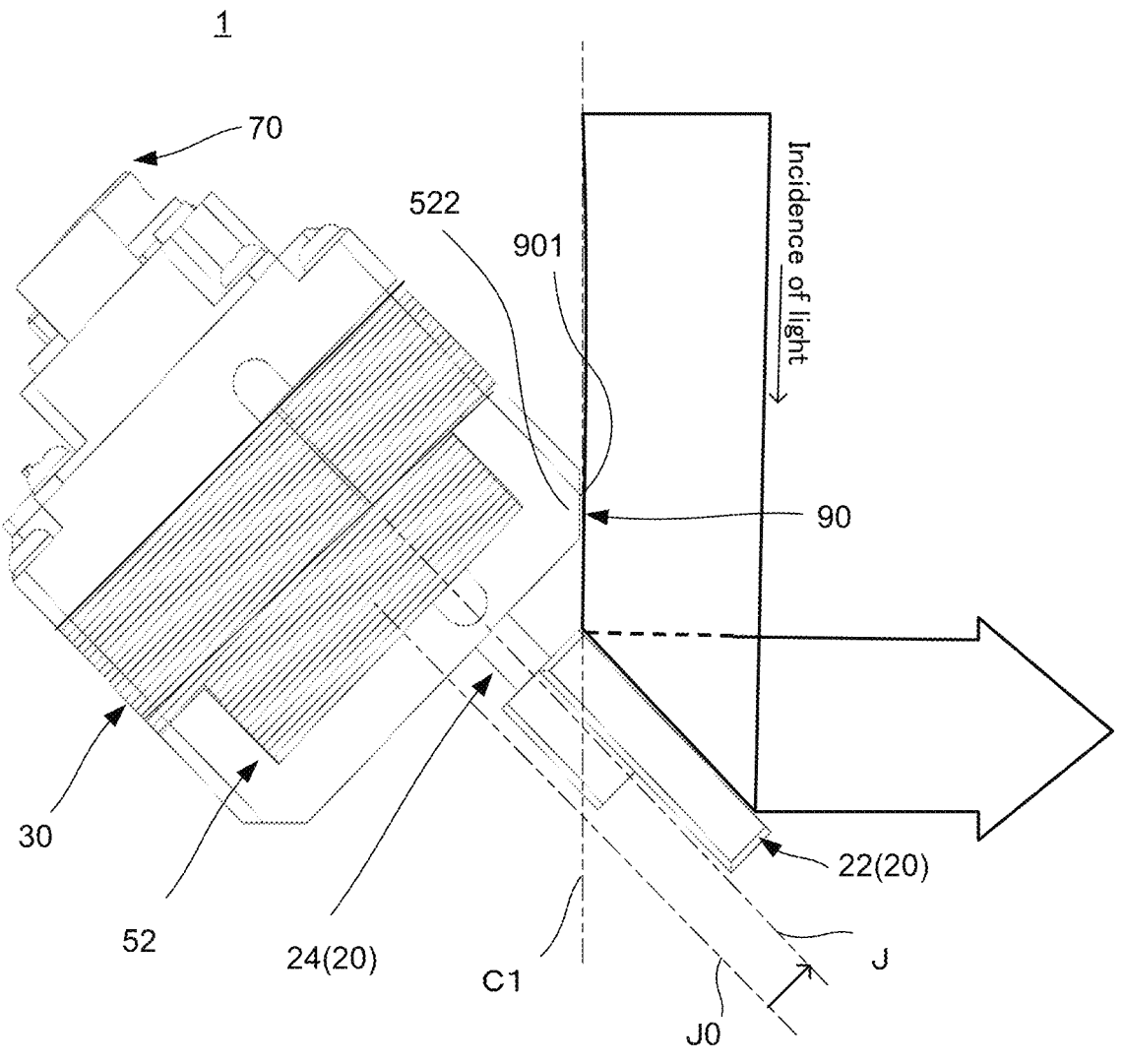
FIG. 17 is an explanatory view of the operation of the rotary reciprocating drive actuator.

FIG. 17 is an explanatory view of the operation of the rotary reciprocating drive actuator of the present embodiment. As illustrated in FIG. 17, rotary reciprocating drive actuator 1 of the present embodiment includes mirror part 22 for emitting incident light by reflecting the light, rotational shaft 24 connected to mirror part 22, and driving unit 10 for driving reciprocating rotation of rotational shaft 24.

Driving unit 10 includes unit fixing part (unit main body) 30 on which optical path avoiding portion 90 for avoiding the optical path is formed. In unit fixing part 30, rotational shaft 24 protrudes from support body portion (one surface) 52 where rotational shaft 24 is disposed to protrude, at a position closer to optical path avoiding portion 90 than the center portion of support body portion 52 is to the optical path avoiding portion. Further, optical path avoiding portion 90 is formed on external corner portion 522 at the edge portion of support body portion 52.

Thus, driving unit 10 itself avoids the optical path of light incident on mirror part 22, and the optical path to mirror part 22 is secured. It is unnecessary to lengthen the shaft portion, and it is possible to reduce the size of the entire product.

Further, in unit fixing part 30, rotational shaft 24 protrudes from first shaft support 50 where rotational shaft 24 is disposed to protrude, at position J closer to optical path avoiding portion 90 than central portion JO of first shaft support 50 is to the optical path avoiding portion. Optical path avoiding portion 90 is formed on external corner portion 522 at the edge portion of first shaft support 50. It is thus possible to change the placement of mirror part 22 by shortening the shaft dimensions. It is possible to secure the optical path, and to suppress the dimensions occupying the product in which the rotary reciprocating drive actuator is mounted. Thus, miniaturization can be achieved.

Further, optical path avoiding portion 90 is disposed on first shaft support 50 for sandwiching core assembly 40. Thus, an excellent rotary reciprocating drive actuator having a high rigidity as a product, and capable of stabilizing the shaft is achieved.

(Modification 1)

Figure 18:
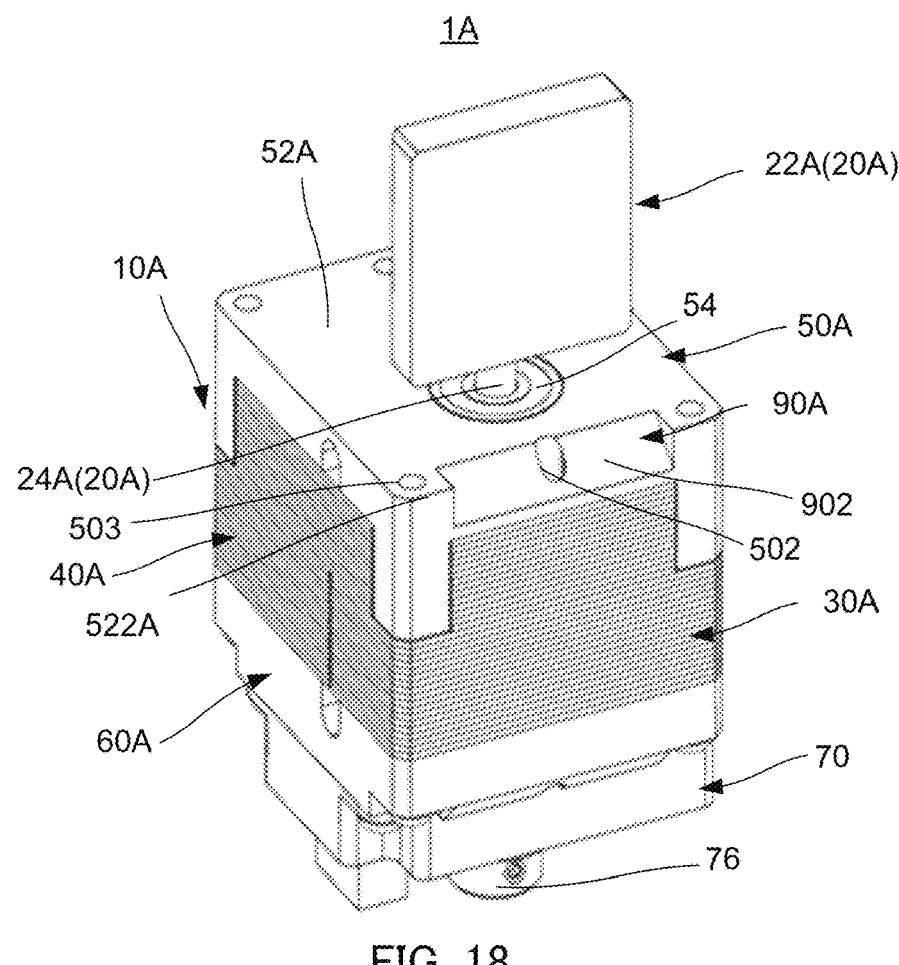
FIG. 18 is an external perspective view illustrating a rotary reciprocating drive actuator of Modification 1.
Figure 19:
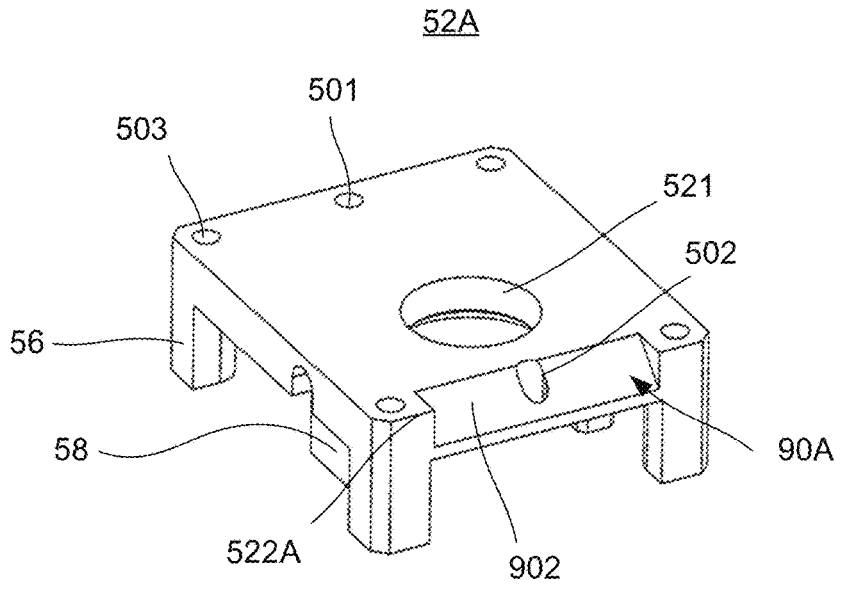
FIG. 19 is a diagram illustrating a support body portion of the first shaft support of rotary reciprocating drive actuator of Modification 1.

FIG. 18 is an external perspective view illustrating a rotary reciprocating drive actuator of Modification 1, and FIG. 19 is a diagram illustrating a support body portion of a first shaft support of the rotary reciprocating drive actuator of Modification 1.

In rotary reciprocating drive actuator 1A illustrated in FIG. 18, the configuration of optical path avoiding portion 90A is different, and other configurations are the same as compared with rotary reciprocating drive actuator 1. Therefore, similar components are denoted by the same names and the same reference numerals while adding letter "A" to the reference numerals, and a detailed description thereof is omitted.

Rotary reciprocating drive actuator 1A has the same function as rotary reciprocating drive actuator 1, and includes driving unit 10A, mirror part 22A, and angle sensor part 70. Driving unit 10A includes unit movable part 20A in which a magnet is fixed to rotational shaft 24A, and unit fixing part 30A for driving reciprocating rotation of driving unit movable part 20A.

Driving unit 10A differs from driving unit 10 in optical path avoiding portion 90A formed on unit fixing part 30A that is a unit main body. Optical path avoiding portion 90A avoids the optical path of light incident on mirror part 22A. In unit fixing part 30A, optical path avoiding portion 90A is formed by cutting out, with respect to rotational shaft 24A serving as a center, a portion of external corner portion 522A at the edge portion of support body portion (one surface) 52A of first shaft support 50A where rotational shaft 24A is disposed to protrude.

As illustrated in FIG. 18, first shaft support 50A including bearing 54 and provided with optical path avoiding portion 90A, together with second shaft support 60A, sandwiches and fixes core assembly 40A (the same as core assembly 40).

Optical path avoiding portion 90A is formed by cutting out a middle portion as the portion of external corner portion 522A at one side portion of a rectangular top surface of support body portion 52A. Optical path avoiding portion 90A is disposed to be inclined toward a side surface from the top surface with respect to rotational shaft 24A serving as a center. Fastening holes 503 are formed in external corner portion 522A on opposite sides of optical path avoiding portion 90A for fixing core assembly 40, second shaft support 60A and the like. Note that, optical path avoiding portion 90A includes light guiding surface 902. In rotary reciprocating drive actuator 1A, mirror part 22 is disposed at a position deviated from the imaginary surface being an extension of guiding surface 902 of optical path avoiding portion 90A.

With this configuration, in driving unit 10A, optical path avoiding portion 90A allows reliable attachment of first shaft support 50A while not obstructing the incidence of light onto mirror part 22A and avoiding the optical path. Thus, it is possible to perform screw fixation or the like by the rigidity of rotary reciprocating drive actuator 1A itself and/or using fastening members 32 or the like via fastening holes 503.

Note that, the width of optical path avoiding portion 90A may be the same width as mirror part 22A. In this case, it is possible to efficiently allow light to be incident on mirror part 22A while enabling the screw fixation to another member through optical path avoiding portion 90A.

(Modification 2)

Figure 20:
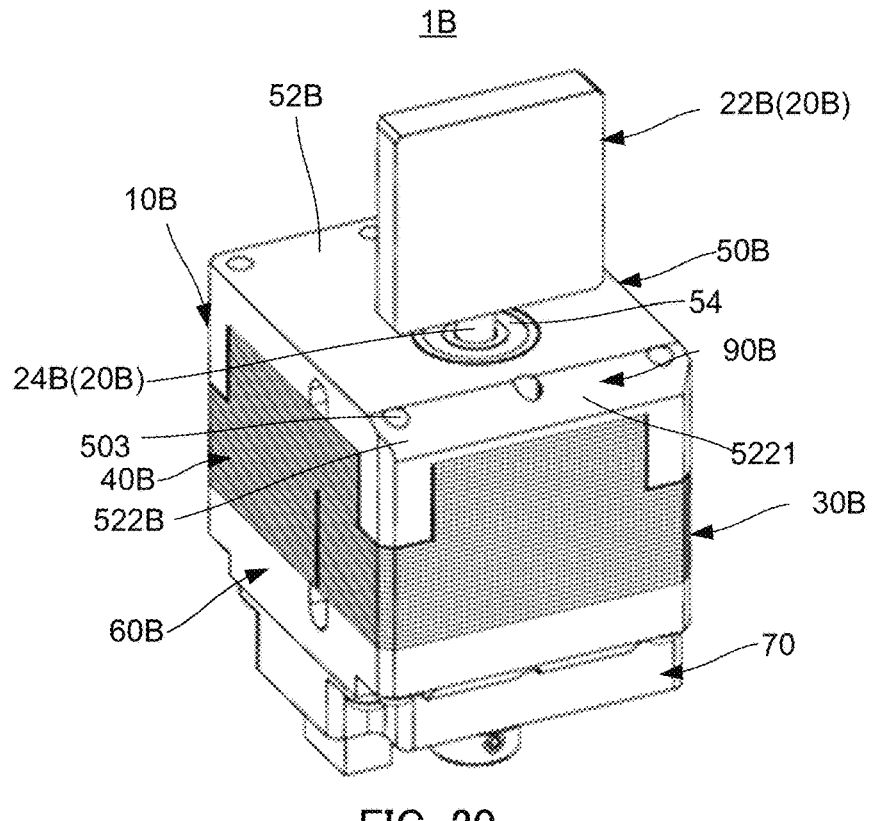
FIG. 20 is an external perspective view illustrating the rotary reciprocating drive actuator of Modification 2.
Figure 21:
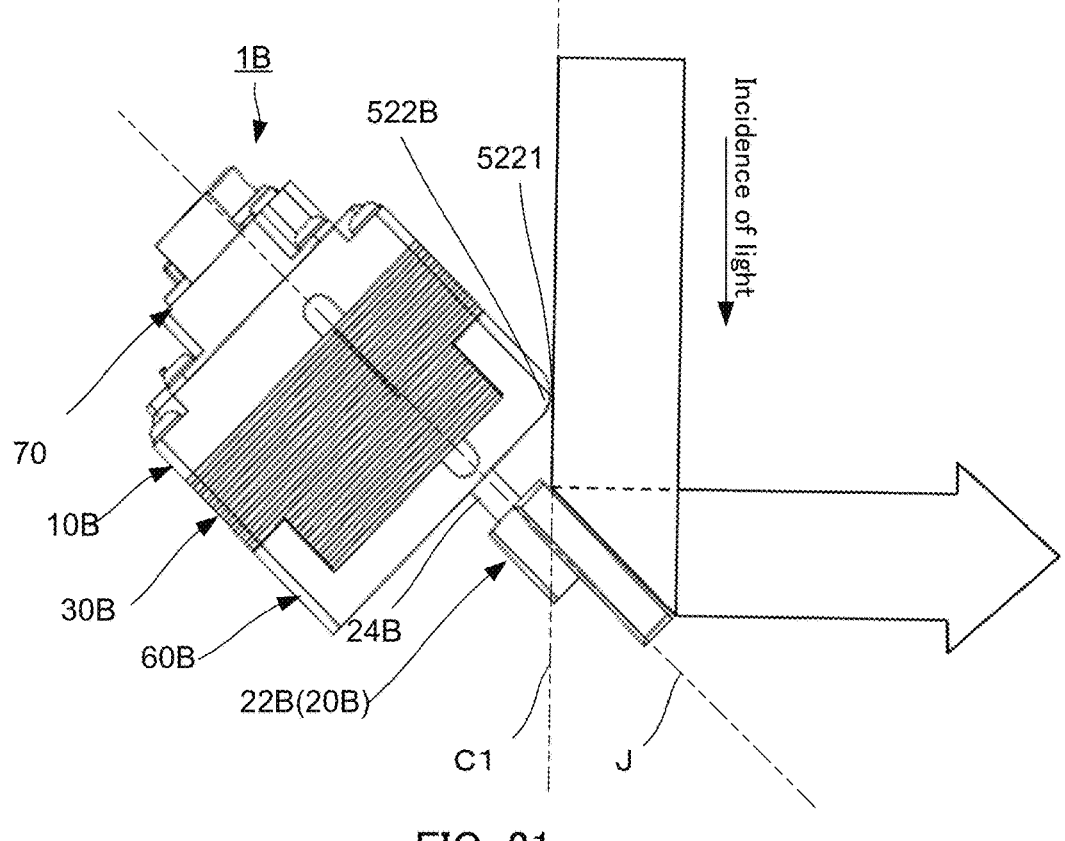
FIG. 21 is an explanatory view of the operation of the rotary reciprocating drive actuator of Modification 2.

FIG. 20 is an external perspective view illustrating a rotary reciprocating drive actuator of Modification 2, and FIG. 21 is an explanatory view of the operation of the rotary reciprocating drive actuator of Modification 2. Note that, the components the same between rotary reciprocating drive actuator 1B and rotary reciprocating drive actuator 1 are provided with the same names and the same reference numerals while adding letter "B" to the reference numerals, and a detailed description thereof will be omitted.

Rotary reciprocating drive actuator 1B has the same function as rotary reciprocating drive actuator 1, and includes driving unit 10B, mirror part 22B, and angle sensor part 70. Driving unit 10B includes unit movable part 20B in which a magnet is fixed to rotational shaft 24B, and unit fixing part 30B for driving reciprocating rotation of driving unit movable part 20B.

In driving unit 10B, optical path avoiding portion 90B formed on unit fixing part 30B that is a unit main body has, at external corner portion 522B, a rounded shape defining light guiding surface (surface of optical path avoiding portion 90B) 5221 including tangent C1 extending along the direction of the optical path. Thus, in rotary reciprocating drive actuator 1B, optical path avoiding portion 90B is formed in a rounded shape. Thus, it is easy to manage the dimensions of optical path avoiding portion 90B. Machining is also easy. It is thus possible to realize the function at a low cost.

(Modification 3)

Figure 22:
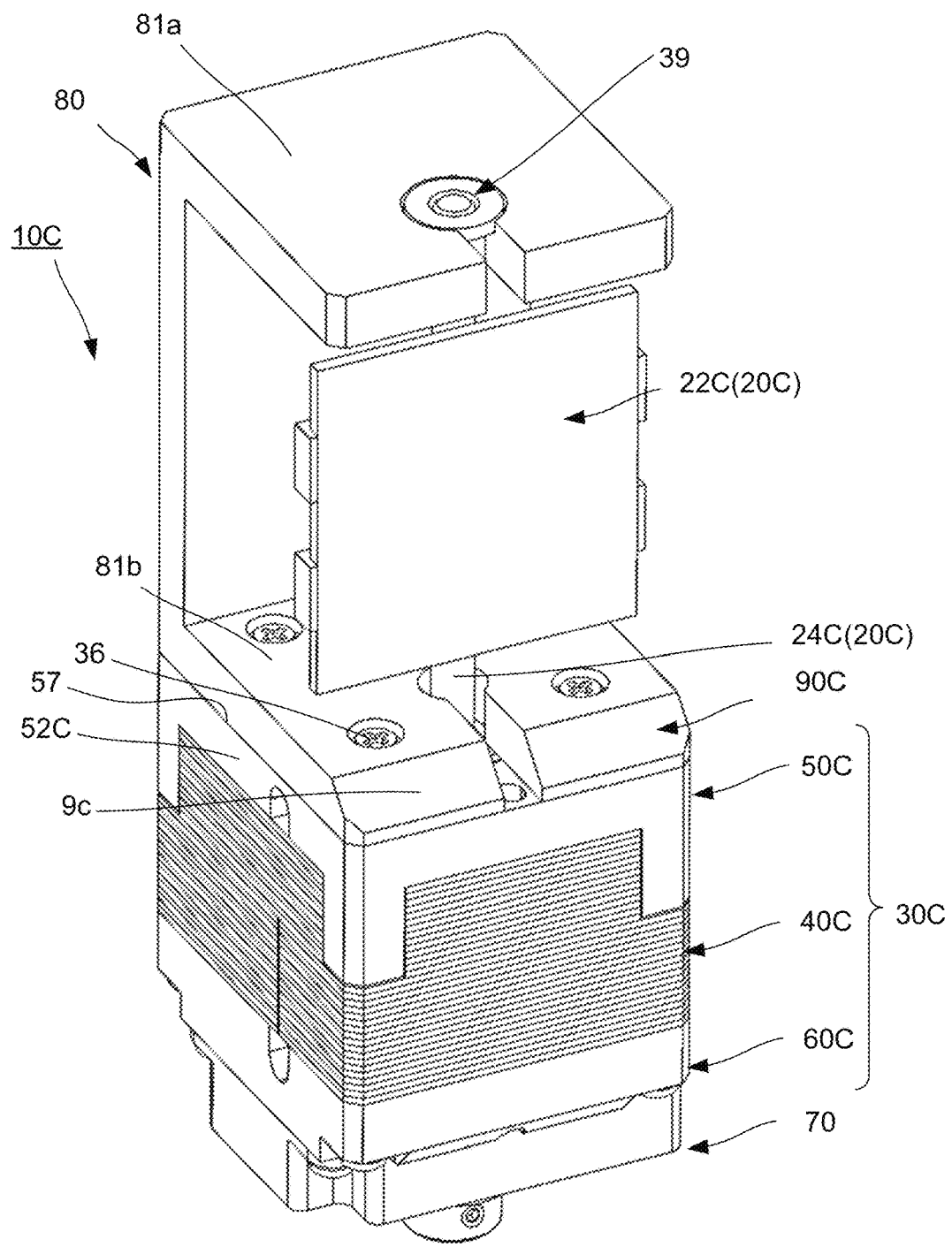
FIG. 22 is an external perspective view of a rotary reciprocating drive actuator of Modification 3.
Figure 23:
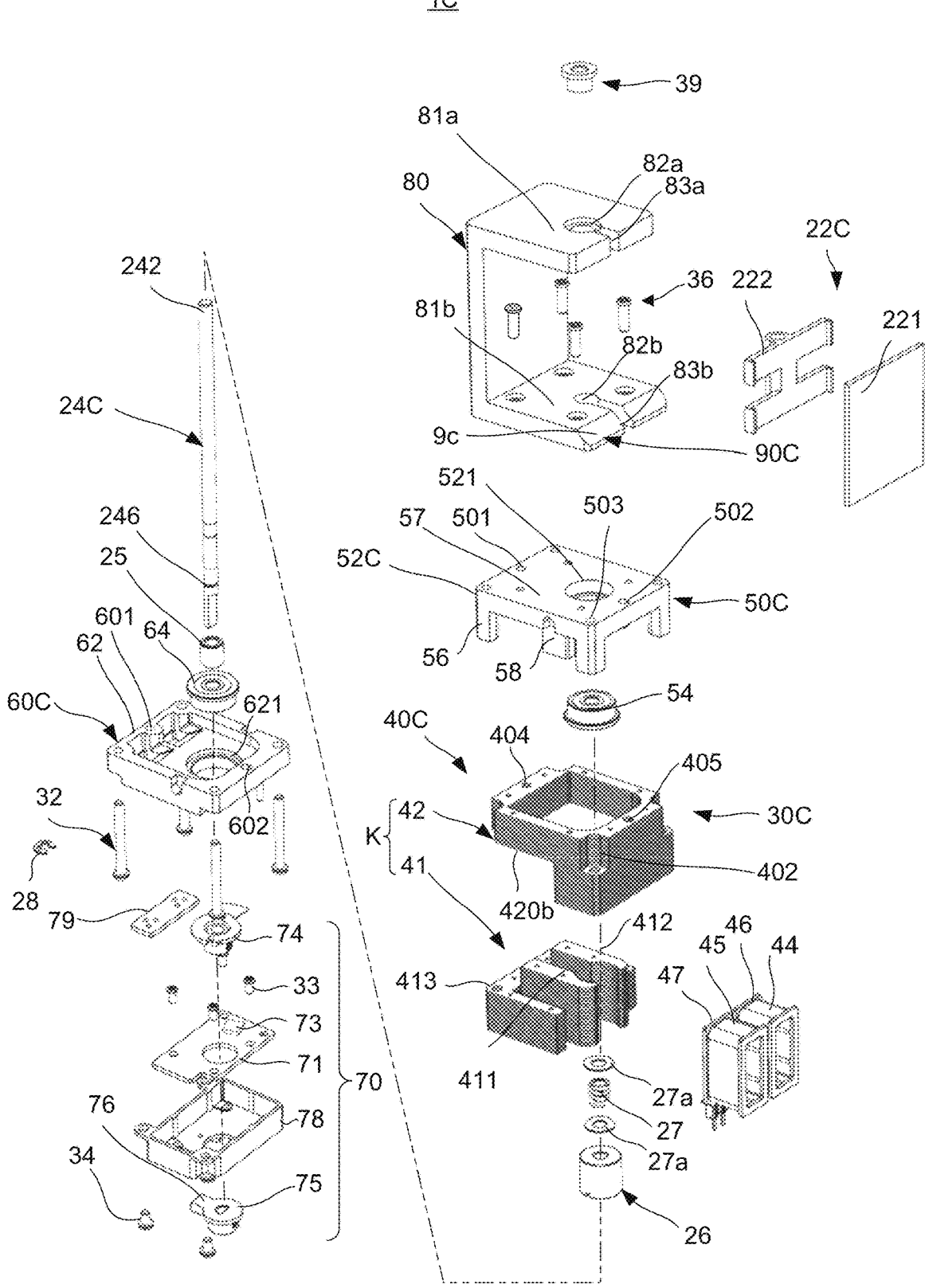
FIG. 23 is a front side exploded perspective view of the rotary reciprocating drive actuator of Modification 3.

FIG. 22 is an external perspective view of a rotary reciprocating drive actuator of Modification 3, and FIG. 23 is a front side exploded perspective view of the rotary reciprocating drive actuator.

Rotary reciprocating drive actuator 1C illustrated in FIGS. 22 and 23 is a rotary reciprocating drive actuator for supporting a movable object such that the movable object is capable of reciprocating rotation, in which the movable object is enlarged as compared with that in rotary reciprocating drive actuator 1.

Rotary reciprocating drive actuator 1C has the same configuration as rotary reciprocating drive actuator 1 except for a difference in that rotary reciprocating drive actuator 1C includes auxiliary frame 80, a difference in the configuration of first shaft support 50C to which auxiliary frame 80 is attached, and a difference in the length of rotational shaft 24C. Therefore, in the following, a description will be given only of different configurations between rotary reciprocating drive actuator 1C and rotary reciprocating drive actuator 1, and a description of the other same configurations will be omitted.

Rotary reciprocating drive actuator 1C has the same function as rotary reciprocating drive actuator 1, and includes driving unit 10C, mirror part 22C, auxiliary frame 80, and angle sensor part 70.

Driving unit 10C differs from driving unit 10 in the configuration of first shaft support 50C in unit fixing part 30. Driving unit 10C includes unit movable part 20C in which a magnet is fixed to rotational shaft 24C, and unit fixing part 30C for driving reciprocating rotation of driving unit movable part 20C.

In driving unit 10C, the top surface of support body portion 52C of first shaft support 50C in unit fixing part 30C differs from that of first shaft support 50 in that the top surface of support body portion 52C has frame fixing surface 57 on which one side wall portion 81b of auxiliary frame 80 is fixed. The top surface of support body portion 52C includes frame fixing surface 57 on which one side wall portion 81b is fixed.

Auxiliary frame 80 is fixed to frame fixing surface 57 via fastening members 36. As compared with driving unit 10, driving unit 10C includes longer rotational shaft 24C, and is configured such that first shaft support 50C and second shaft support 60C sandwich core assembly 40C.

Rotational shaft 24C has such a length as to extend between wall portions 81a and 81b of auxiliary frame 80, and is disposed to extend from insertion hole 82b to insertion hole 82a.

In rotary reciprocating drive actuator 1C, auxiliary frame 80 is attached to driving unit 10C and mirror part 22C being a movable object is supported such that reciprocating rotation can be driven.

Auxiliary frame 80 is a member including a pair of wall portions 81a and 81b and having a substantial U shape turned sideways when seen in a section. Insertion holes 82a and 82b through which rotational shaft 24C is inserted are formed in a pair of wall portions 81a and 81b, respectively. Rotation support portion 39 in which a tip end of rotational shaft 24C is rotatably inserted is fitted in insertion hole 82a. Further, cutout holes 83a and 83b communicating between insertion holes 82a and 82b and the outer edges of the wall portions 81a and 81b, respectively, are formed in the pair of wall portions 81a and 81b.

Wall portion 81b is provided with optical path avoiding portion 90C. Optical path avoiding portion 90C avoids the optical path to mirror part 22C held to be capable of reciprocating between a pair of wall portions 81a and 81b of auxiliary frame 80, and preferably allows light to be incident on the mirror part and to be emitted during the movement of mirror part 22C. Wall portion 81b is fixed to frame fixing surface 57, from which rotational shaft 24C protrudes.

Rotation support portion 39 may have any configuration as long as it supports inserted rotational shaft 24C such that the rotational shaft is rotatable, and may include a sliding bearing, a resin-made bushing, or the like. Rotation support portion 39 supports, between a pair of wall portions 81a and 81b of auxiliary frame 80, tip end portion 242 of rotational shaft 24C to which mirror part 22C is attached.

Thus, in a state in which mirror part 22C is fixed to rotational shaft 24C, rotational shaft 24 can be disposed at a position of rotational shaft 24C via cutout holes 83a and 83b. Further, rotational shaft 24C is disposed between wall portions 81a and 81b of auxiliary frame 80.

When there are no cutout holes 83a and 83b, rotational shaft 24 is inserted into both insertion holes 82a and 82b in wall portions 81a and 81b in a state where mirror part 22 is disposed between the pair of wall portions 81a and 81b. In addition, complicated assembly work such as fixing inserted rotational shaft 24 to mirror 22 is required. In contrast, in the present embodiment, cutout holes 83a and 83b are formed. Thus, rotational shaft 24 to which mirror part 22 is fixed in advance can be easily inserted into insertion holes 82a and 82b.

Figures 24, 25:
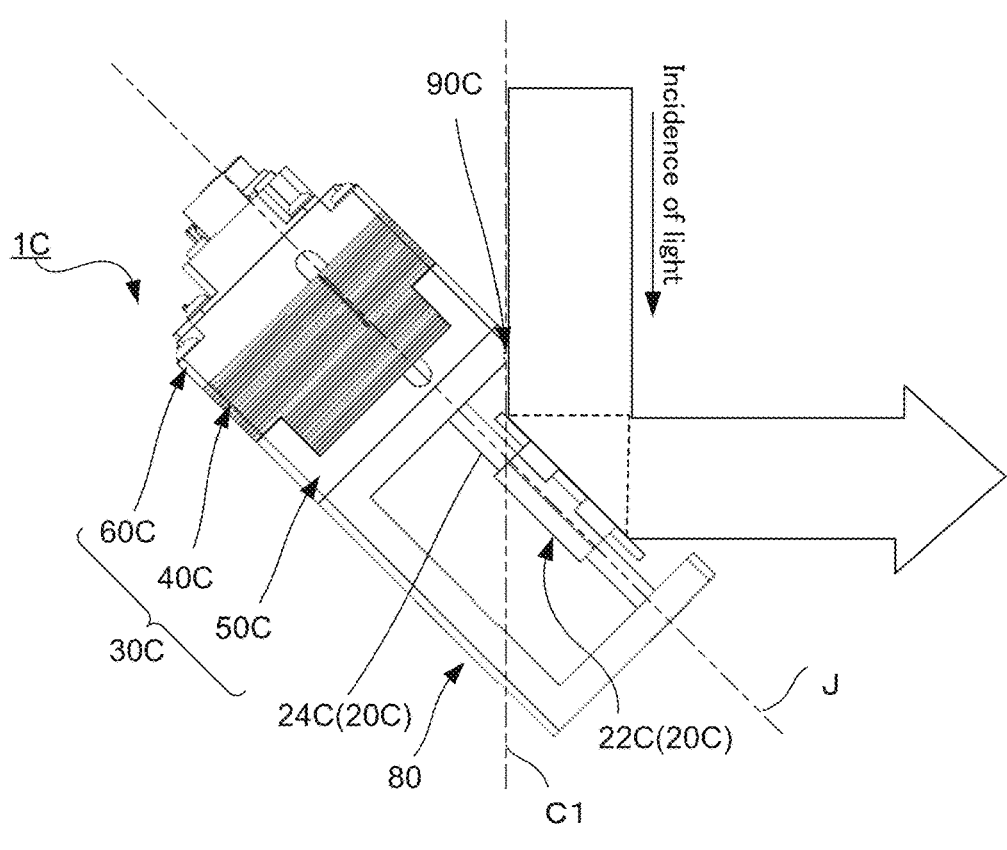
FIG. 24 is an explanatory view of the operation of the rotary reciprocating drive actuator of Modification 3.
FIG. 25 is a diagram illustrating a principal part configuration of a scanner system using the rotary reciprocating drive actuator.

FIG. 24 is an explanatory view of the operation of the rotary reciprocating drive actuator of Modification 3. As illustrated in FIG. 24, optical path avoiding portion 90C is formed such that imaginary surface C 1 being an extension of light guiding surface 9c intersects mirror part 22C or rotational shaft 24C at a position closer to unit fixing part 30 than the end portion of the effective reflecting region of mirror part 22C on the unit fixing part 30C side is to the unit fixing part.

According to this configuration, when the movable object is enlarged, i.e., even when mirror part 22C is supported by supporting driving unit 10C with a cantilever structure, it is possible to stabilize the behavior of mirror part 22C, to ensure impact resistance and vibration properties, and to stably support the mirror part such that the mirror part is capable of reciprocating rotation. In addition, with this configuration, when the movable object is enlarged, it is possible to allow light to be stably incident on mirror part 22C by driving unit 10C avoiding the optical path.

FIG. 25 is a block diagram illustrating a principal structure of scanner system 100 using rotary reciprocating drive actuator 1.

Scanner system 100 includes, in addition to rotary reciprocating drive actuator 1, laser beam emitting part 101, laser control part 102, drive signal supply part 103, and position control signal calculation part 104.

Laser beam emitting part 101 includes, for example, a Laser Diode (LD) serving as a light source, and a lens system for focusing the laser beam output by the light source. Laser control part 102 controls laser beam emitting part 101. A laser beam emitted by laser beam emitting part 101 is incident on mirror 221 of rotary reciprocating drive actuator 1.

With reference to an angular position of rotational shaft 24 (mirror 221) obtained by angle sensor part 70 and a target angle position, position control signal calculation part 104 generates and outputs a drive signal for controlling rotational shaft 24 (mirror 221) such that the mirror comes to the target angle position. For example, position control signal calculation part 104 generates a position control signal based on the obtained angular position of rotational shaft 24 (mirror 221) and a signal indicating the target angle position as converted using a saw waveform data or the like stored in a waveform memory (not illustrated), and outputs the position control signal to drive signal supply part 103.

Based on the position control signal, drive signal supply part 103 supplies, to coils 44 and 45 of rotary reciprocating drive actuator 1, a drive signal such that the angular position of rotational shaft 24 (mirror 221) comes to the desired angular position. Thus, scanner system 100 can emit scanning light from rotary reciprocating drive actuator 1 to a predetermined scanning region.

Optical path avoiding portion 90 may have a chamfered shape defining light guiding surface 901 extending along the direction of the optical path. With this configuration, the dimensions can be easily defined. For example, without partially sectioning a product, the shape can be easily grasped by viewing the product from the side.

Note that, even in a configuration in which the tip end of rotational shaft 24 is away from first bearing 54 as in Modification 3, suitable support is possible by auxiliary frame 80 and rotation support portion 39.

Core body K is composed of magnetic pole core 41 and magnetic path core 42 separate from each other. Magnetic poles 411a and 412a in magnetic pole core 41 has an integral structure at positions facing the outer periphery of magnet 26. Thus, even when the shape of core body K including magnetic pole core 41 and magnetic path core 42 is complicated, the arrangement accuracy of a plurality of magnetic poles 411a and 412a does not have to be lowered and manufacture is easy. In addition, two magnetic poles, i.e., the plurality of magnetic poles 411a and 412b, are included. Thus, the swing width angle can be increased.

The number of magnetic poles of magnet 26 is equal to the number of magnetic poles 411a and 412a. Unit fixing part 30 includes rotational angle position holding portion (magnet position holding portion) 48 disposed to face magnet 26 via air gap G. With respect to the reference position, i.e., the rotational angle position of rotational shaft 24 or magnet 26 serving as the neutral position, rotational angle position holding portion 48 holds magnet 26 by the magnetic attraction force generated between the rotational angle position holder portion and magnet 26. The reference position is a rotation center position of the reciprocating rotation of magnet 26.

By switching the energization directions to the plurality of coils 44 and 45, the flow of magnetic flux passing through magnetic pole core 41 and magnetic path core 42 having the integral structure is generated in core assembly 40 while being switched. Accordingly, electromagnetic interaction between the magnetic flux and magnet 26 causes reciprocating rotation of the movable body about the axis of rotational shaft 24.

Magnetic pole core 41 and magnetic path core 42 are laminated members. Thus, these cores do not require effort in manufacturing. It is possible to configure magnetic pole core 41 and magnetic path core 42 with a complex shape at a low cost. Magnetic pole core 41 includes a plurality of rod-shaped bodies 411 and 412 and connecting frame-shaped body 413 that connects the plurality of rod-shaped bodies 411 and 412 to each other in an integral structure. The plurality of rod-shaped bodies 411 and 412 include a plurality of magnetic poles 411a and 412a at their tip end portions, respectively, and extend in parallel to each other from base end portions 411b and 412b to the tip end portions. The plurality of coils 44 and 45 are externally fitted to the intermediate portions of the rod-shaped bodies, respectively. Connecting frame-shaped body 413 extends in a direction intersecting the parallel direction of rod-shaped bodies 411 and 412 at base end portions 411b and 412b.

Magnetic pole core 41 is assembled to magnetic path core 42. Magnetic path core 42 faces and makes surface contact with connecting frame-shaped body 413 in the extending direction of rotational shaft 24. A plurality of magnetic poles 411a and 412a are positioned around rotational shaft 24, with coils 44 and 45 being adjacent to the magnetic poles in a stable state.

Thus, even in the case of a core having magnetic poles 411a and 412a disposed to face each other across magnet 26, it is possible to reduce the manufacturing cost while achieving a high output. It is possible to increase the arrangement accuracy for magnetic poles 411a and 412a, to arrange the magnetic poles without variation. Therefore, it is possible to improve the reliability of rotary reciprocating drive actuator 1.

Further, magnetic path core 42 includes extension portions (lateral side portions 421 and 422 and bridge portion 423) extending outside of rod-shaped bodies 411 and 412. The extension portions, together with connecting frame-shaped body 413, are disposed around rotational shaft 24 so as to surround coils 44 and 45. Thus, it is possible to suppress electromagnetic noise generated from energized coils 44 and 45. Further, it is possible to suppress the leakage magnetic flux from coils 44 and 45 and magnet 26, to prevent an electromagnetic influence on an external device.

Further, when rotational angle position holding portion 48 is a magnet, it is possible to more accurately position the movable object to the reference position of the movable body when reciprocating rotation of the movable body is driven. It is possible to drive reciprocation from that position, to ensure reciprocation drive.

Further, the movable object is mirror part 22 (particularly, mirror 221) for reflecting the scanning light. Thus, rotary reciprocating drive actuator 1 can be used in an application of a scanner that performs optical scanning.

While the invention made by the present inventors has been specifically described based on the preferred embodiment, it is not intended to limit the present invention to the above-mentioned preferred embodiment, but the present invention may be further modified within the scope and spirit of the invention defined by the appended claims.

For example, the embodiment has been described in connection with the case where the movable object is mirror part 22, but the movable object is not limited to this. The movable object may be, for example, an imaging device such as a camera.

For example, while the embodiment has been described in connection with the case of resonantly driving rotary reciprocating drive actuator 1, the present invention is also applicable to the case of non-resonant driving.

The configuration of unit fixing part 30 is not limited to that described in the embodiment. For example, the core only needs to include the magnetic pole portions which are magnetically excited by energization of the coils to generate polarities, and only needs to be such that when the rotational shaft is attached to the unit fixing part, the magnetic pole portions and the outer peripheral surface of the magnet face each other via an air gap. Further, the coils only need to be configured to generate a magnetic flux suitably from one of the magnetic pole portions of the core toward the other.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

INDUSTRIAL APPLICABILITY

The present invention is suitable for, for example, a LiDAR apparatus, a scanner system, and the like.

REFERENCE SIGNS LIST

1, 1A, 1B, 1C Rotary reciprocating drive actuator
9c, 901, 902, 5221 Light guiding surface
10, 10A Driving unit
20, 20A, 20B, 20B, 20C Unit movable part
22, 22A, 22B, 22C Mirror part
24, 24A, 24B, 24C Rotational shaft
25 Spacer
26 Magnet (movable magnet)
26a, 26b Pole
26c, 26d Boundary portion (magnetic pole switching portion)
27 Preload spring
27a Washer
28 Shaft support ring
30, 30A, 30B, 30C Unit fixing part (unit main body)
32, 33, 34, 36 Fastening member
39 Rotation support portion
40, 40A, 40B, 40C Core assembly
41 Magnetic pole core
42 Magnetic path core
44, 45 Coil
46, 47 Bobbin
48 Angle position holding portion
50, 50A, 50B, 50C first shaft support
51a, 61a, 521, 621 Through hole

52, 52A, 52B, 52C, 62 Support body portion
54 First bearing
56 Attachment leg
57 Frame fixing surface
58 Core holding portion
60, 60A, 60B, 60C Second shaft support
64 Second bearing
70 Angle sensor part
71 Circuit board
73 Optical sensor
74 Encoder disk
75 Stopper part
76 Protruding portion
77 Restricting portion
78 Sensor attachment portion
79 Board
80 Auxiliary frame
81a, 81b One side wall portion
82a, 82b Insertion hole
83a, 83b Cutout hole
90, 90A, 90B, 90C Optical path avoiding portion
100 Scanner system
101 Laser beam emitting part
102 Laser control part
103 Signal supply part
104 Signal calculation part
221 Mirror
222 Mirror holder
223 Insertion hole
242 Tip end portion
401 Attachment hole
402 Engagement recess
403, 404, 405, 501, 502, 601, 602 Positioning hole
411, 412 Rod-shaped body
411a 412a Magnetic pole
411b, 412b, 421b, 422b Base end portion
413 Connecting frame-shaped body
413a Connecting side portion
413b, 413c Protruding side portion
420 Surrounding portion
420a Magnetic-path-side contact surface
420b Cutout portion
421, 422 Lateral side portion
423 Bridge portion
424 Magnetic-path-side connecting side portion
503, 603 Fastening hole
4130 Magnetic-pole-side contact surface
522, 522A, 522B External corner portion
K Core body

The invention claimed is:

1. A rotary reciprocating drive actuator, comprising:

a movable body including a shaft portion to which a movable object is to be connected and a magnet fixed to the shaft portion;

a core assembly including a pair of parallel rod-shaped bodies, each of which has a plurality of magnetic poles at tip end portions of the rod-shaped bodies, the magnetic poles being arranged to face the outer periphery of the magnet, and on which a plurality of coils are respectively arranged; and a surrounding portion that forms a rectangular frame-shaped body to surround the pair of rod-shaped bodies and connects base end portions of the pair of rod-shaped bodies to form a magnetic path connecting the magnetic poles of the pair of rod-shaped bodies; and a pair of shaft supports configured to sandwich the core assembly in an extending direction of extension of the shaft portion and support the shaft portion at opposite sides of the core assembly such that the shaft portion is rotatable, wherein a magnetic flux passing through the pair of parallel rod-shaped bodies and the surrounding portion is generated by energization of the plurality of coils, causing reciprocating rotation of the movable body about an axis of the shaft portion by electromagnetic interaction between the magnetic flux and the magnet.

2. The rotary reciprocating drive actuator according to claim 1, wherein the core assembly includes:

a magnetic pole core with an integral structure including the plurality of magnetic poles, and a magnetic path core that, together with the magnetic pole core, forms a magnetic path of the magnetic flux, and the magnetic pole core and the magnetic path core are assembled to each other by being sandwiched by the pair of shaft supports while facing each other and being in surface contact with each other in the extending direction of extension of the shaft portion.

3. The rotary reciprocating drive actuator according to claim 2, wherein the magnetic path core is assembled to the magnetic pole core in a state where the plurality of magnetic poles are positioned around the shaft portion.

4. The rotary reciprocating drive actuator according to claim 2, wherein at least one of the pair of shaft supports includes a core holding portion disposed to protrude inward of the core assembly and interposed between the magnetic path core and the plurality of magnetic poles to hold positions of both of the magnetic path core and the plurality of magnetic poles.

5. The rotary reciprocating drive actuator according to claim 1, wherein the core assembly includes a magnet position holding portion that is a magnetic body disposed to face the magnet and that is configured to magnetically attract the magnet to a reference position.

6. The rotary reciprocating drive actuator according to claim 5, wherein the reference position to which the magnet position holding portion magnetically attracts the magnet is a rotational center position of the reciprocating rotation of the magnet.

7. The rotary reciprocating drive actuator according to claim 1, wherein the plurality of coils are disposed to be adjacent respectively to the plurality of magnetic poles and to be parallel to each other.

8. The rotary reciprocating drive actuator according to claim 1, wherein each of the pair of shaft supports includes a bearing portion in which the shaft portion is inserted, and a support main body portion formed from an electromagnetic shielding material covering the core assembly in the extending direction of extension of the shaft portion.

9. The rotary reciprocating drive actuator according to claim 8, wherein the electromagnetic shielding material includes an aluminum alloy.

10. The rotary reciprocating drive actuator according to claim 1, wherein the core assembly includes a core body having a plurality of rod-shaped bodies and the surrounding portion, and a plurality of coils, and the core body is composed of a laminated member.

11. The rotary reciprocating drive actuator according to claim 1, wherein the pair of shaft supports include a first shaft support and a second shaft support, the movable object is disposed opposite the core assembly with respect to the first shaft support, and an angle sensor for detecting a rotational angle of the shaft portion is disposed opposite the core assembly with respect to the second shaft support.

12. The rotary reciprocating drive actuator according to claim 11, further comprising:

a cover attached to the second shaft support to cover the angle sensor.

13. The rotary reciprocating drive actuator according to claim 1, wherein:

the movable object is connected to one end portion of the shaft portion which protrudes from the first shaft support of the pair of shaft supports, and a tip end of the movable object fixed to the one end portion of the shaft portion is provided with a rotational shaft supporting portion fixed to a supporting wall portion disposed to sandwich the movable object between the supporting wall portion and the first shaft support.

14. The rotary reciprocating drive actuator according to claim 13, wherein the rotational shaft supporting portion is a plain bearing.

15. The rotary reciprocating drive actuator according to claim 13, wherein the rotational shaft supporting portion is a bush made of a resin.

16. The rotary reciprocating drive actuator according to claim 1, further comprising:

a rotational angle restricting portion for restricting a maximum rotational angle of the shaft portion during the reciprocating rotation with respect to the core assembly.

17. The rotary reciprocating drive actuator according to claim 1, wherein the core assembly is provided with a positioning portion for defining a position of the pair of shaft supports that sandwich the core assembly.

18. The rotary reciprocating drive actuator according to claim 1, wherein the movable object is a mirror that reflects scanning light.

19. The rotary reciprocating drive actuator comprising:

a movable body including a shaft portion to which a movable object is to be connected and a magnet fixed to the shaft portion;

a fixing body including a core assembly, the core assembly including a core body and a plurality of coils, the core body having a plurality of magnetic poles, the core assembly being disposed such that the plurality of magnetic poles face an outer periphery of the magnet; and a pair of shaft supports configured to sandwich the core assembly in an extending direction of extension of the shaft portion and support the shaft portion at opposite sides of the core assembly such that the shaft portion is rotatable, wherein a magnetic flux passing through the core body is generated by energization of the plurality of coils, causing reciprocating rotation of the movable body about an axis of the shaft portion by electromagnetic interaction between the magnetic flux and the magnet;

a mirror for reflecting light incident on the mirror to emit the light, the mirror being the movable object; and a driving unit including the shaft portion, the movable body, the fixing body; and the pair of shaft supports, the shaft portion being connected to the mirror, the driving unit being configured to drive reciprocating rotation of the shaft portion, wherein the driving unit includes a unit main body in which an optical path avoiding portion for avoiding an optical path is formed.

20. The rotary reciprocating drive actuator according to claim 19, wherein the shaft portion protrudes from one surface of the unit main body where the shaft portion is disposed to protrude, the shaft portion protruding at a position closer to the optical path avoiding portion than a central portion of the one surface is to the optical path avoiding portion, and the optical path avoiding portion is formed in or on an external corner portion at an edge portion of the one surface.

21. The rotary reciprocating drive actuator according to claim 19, wherein the optical path avoiding portion is formed by partly cutting out, around the shaft portion, an external corner portion at an edge portion of one surface of the unit main body where the shaft portion is disposed to protrude.

22. The rotary reciprocating drive actuator according to claim 19, wherein the optical path avoiding portion has a chamfered shape defining a light guiding surface extending along a direction of the optical path.

23. The rotary reciprocating drive actuator according to claim 19, wherein the optical path avoiding portion is formed such that an imaginary surface being an extension of a light guiding surface extending along a direction of the optical path intersects the mirror or the shaft portion at a position closer to the unit main body than an end portion of an effective reflection region of the mirror on the unit main body side is to the unit body, and an angle formed between the imaginary surface and the shaft portion is approximately 45°.

24. The rotary reciprocating drive actuator according to claim 19, wherein the optical path avoiding portion has a rounded shape defining a light guiding surface including a tangent line extending along a direction of the optical path.

25. The rotary reciprocating drive actuator according to claim 19, wherein the driving unit includes:

a movable magnet fixed to the shaft portion, and the fixing body including a core, a coil, and a magnetic body, the core being disposed to face the movable magnet in a radial direction, the coil being disposed adjacently to the core, the magnetic body being disposed at a position to magnetically attract the movable magnet, the position being different from a position of the core, and a magnetic flux passing through the core is generated by energization of the coil, causing reciprocating rotation of the movable magnet about an axis of the shaft portion with respect to the position as a center by electromagnetic interaction between the magnetic flux and the movable magnet.

* * * * *